US012579712B2

(12) United States Patent
Tinklenberg et al.

(10) Patent No.: US 12,579,712 B2
(45) Date of Patent: Mar. 17, 2026

(54) ASSET CREATION USING GENERATIVE ARTIFICIAL INTELLIGENCE

(71) Applicants: Sony Interactive Entertainment Inc., Tokyo (JP); Sony Interactive Entertainment LLC, San Mateo, CA (US)

(72) Inventors: Bethany Tinklenberg, Oakland, CA (US); Edward Y. Cheung, Castro Valley, CA (US); Tatianna Forget, Mountain View, CA (US); Valentino Aldana, San Francisco, CA (US)

(73) Assignees: Sony Interactive Entertainment Inc., Tokyo (JP); Sony Interactive Entertainment LLC, San Mateo, CA (US)

( * ) Notice: Subject to any disclaimer, the term of this patent is extended or adjusted under 35 U.S.C. 154(b) by 218 days.

(21) Appl. No.: 18/420,037

(22) Filed: Jan. 23, 2024

(65) Prior Publication Data

US 2025/0238985 A1     Jul. 24, 2025

(51) Int. Cl.
  G06T 11/60     (2006.01)
  A63F 13/58     (2014.01)
  G06N 3/0455    (2023.01)
(52) U.S. Cl.
  CPC .............. G06T 11/60 (2013.01); A63F 13/58 (2014.09); G06N 3/0455 (2023.01); G06T 2200/24 (2013.01)
(58) Field of Classification Search
  CPC ...... G06N 3/0455; G06N 3/047; G06N 3/088; G06N 3/045; G06T 11/00; G06T 11/60;
  (Continued)

(56) References Cited

U.S. PATENT DOCUMENTS

| | | | |
|---|---|---|---|
| 12,430,829 B2 * | 9/2025 | Xie .......................... | G06T 11/60 |
| 2025/0148670 A1 * | 5/2025 | Lupascu ................ | G06V 10/56 |

(Continued)

FOREIGN PATENT DOCUMENTS

JP          2010029397 A       2/2010

OTHER PUBLICATIONS

Cheng et al., "SDFusion: Multimodal 3D Shape Completion, Reconstruction, and Generation," CoRR, Submitted on Dec. 8, 2022, arXiv:2212.04493v1, 17 pages.
(Continued)

*Primary Examiner* — Xilin Guo
(74) *Attorney, Agent, or Firm* — Fish & Richardson P.C.

(57) ABSTRACT

A method including collecting one or more inputs, each of which describes a target object. The method including generating a plurality of images of the target object using an image generation artificial intelligence system configured for implementing latent diffusion based on the one or more inputs. The method including decomposing the target object into a first plurality of attributes based on the plurality of images of the target object, wherein each of the plurality of attributes includes one or more variations. The method including receiving selection of one or more of a plurality of variations of the plurality of attributes. The method including blending the one or more of the plurality of variations of the plurality of attributes that have been selected into one or more options of the target object.

20 Claims, 10 Drawing Sheets

<u>300</u>

(58) Field of Classification Search
CPC ..... G06T 17/00; G06T 15/00; G06T 2200/24;
A63F 13/58
See application file for complete search history.

(56) References Cited

U.S. PATENT DOCUMENTS

| | | | |
|---|---|---|---|
| 2025/0157106 A1* | 5/2025 | Paga | G06T 11/60 |
| 2025/0166133 A1* | 5/2025 | Kahatapitiya | G06T 5/60 |
| 2025/0166307 A1* | 5/2025 | Gadelha | G06T 19/00 |
| 2025/0166664 A1* | 5/2025 | Karim | G06F 40/40 |

OTHER PUBLICATIONS

Extended European Search Report in European Appln. 25153402.0, mailed on Jun. 2, 2025, 10 pages.

Li et al., "3DDesigner: Towards Photorealistic 3D Object Generation and Editing with Text-guided Diffusion Models," CoRR, Submitted on Oct. 12, 2023, arXiv:2211.14108v3, 16 pages.

Paschalidou et al., "Learning Unsupervised Hierarchical Part Decomposition of 3D Objects From a Single RGB Image," 2020 IEEE/CVF Conference on Computer Vision and Pattern Recognition (CVPR), IEEE, Jun. 13, 2020, pp. 1057-1067.

Rombach et al., "High-Resolution Image Synthesis with Latent Diffusion Models," CoRR, Submitted on Apr. 13, 2022, arXiv:2112.10752v2, 45 pages.

Ad-comi.co.jp [online], "[ChatGPT x image generation AI] How to Create Corporate Characters Revealed! Samples available," Sep. 4, 2023, retrieved on Jan. 27, 2026, retrieved from URL<https://ad-comi.co.jp/adrans/chatgpt-generativeai_character/>, 53 pages (with Machine Translation).

Ad-comi.co.jp [online], "[ChatGPT x image generation AI] Tried to make a character," available on or before Sep. 4, 2023, via Internet Archive: Wayback Machine URL <http://web.archive.org/web/20230904061545/https://ad-comi.co.jp/adrans/chatgpt-generativeai_character/>, retrieved on Jan. 26, 2026, retrieved from URL <https://ad-comi.co.jp/adrans/chatgpt-generativeai_character/>, 26 pages (with Machine Translation).

Note.com [online], "Try using AI to create an ori character that may be used for live game commentary or videos," Jan. 18, 2024, retrieved on Jan. 27, 2026, retrieved from URL <https://note.com/anchor9017/n/n684197662654>, 28 pages (with Machine Translation).

Qiita.com [online], "Generate game characters with AI [Stable Diffusion on Mac]," Mar. 21, 2023, retrieved on Jan. 27, 2026, retrieved from URL <https://qiita.com/john-rocky/items/10a79541e30a21d6cc4a>, 17 pages (with Machine Translation).

Zenn.com [online], "Let's make enemy characters in the game by AI [DALL E2]," Jun. 8, 2023, retrieved on Jan. 27, 2026, retrieved from URL >https://zenn/dev/sotetu/articles/00618ed992135c>, 15 pages (with Machine Translation).

* cited by examiner

<u>300</u>

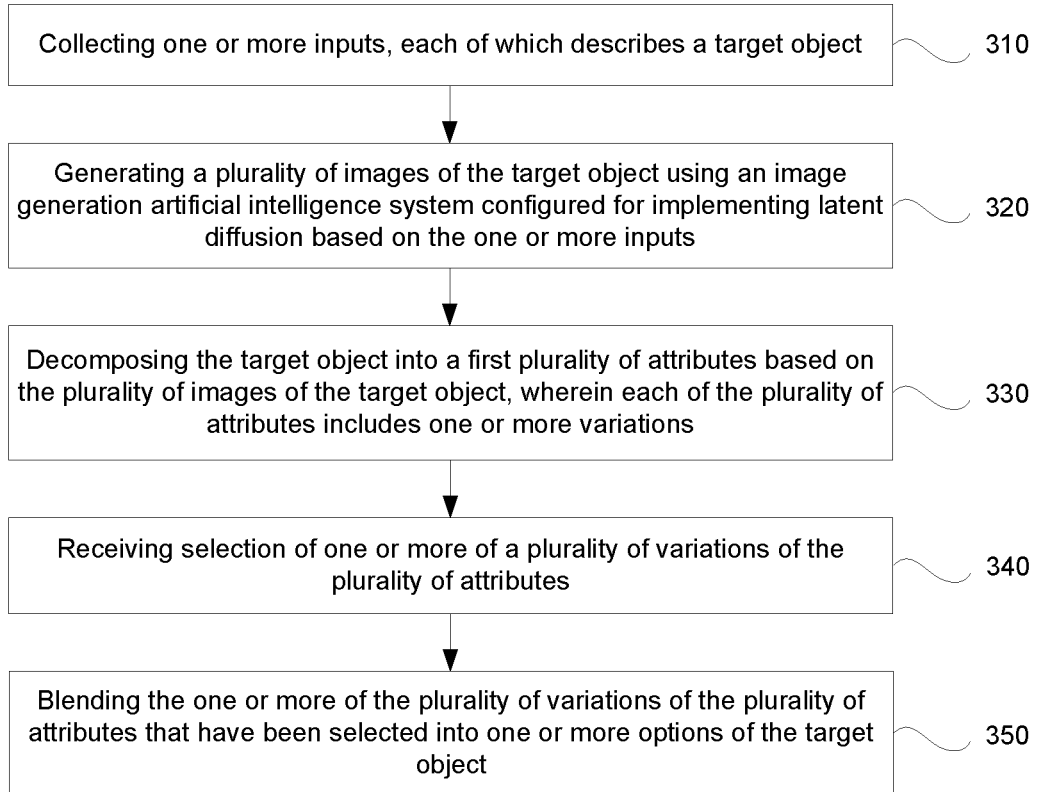

Collecting one or more inputs, each of which describes a target object — 310

Generating a plurality of images of the target object using an image generation artificial intelligence system configured for implementing latent diffusion based on the one or more inputs — 320

Decomposing the target object into a first plurality of attributes based on the plurality of images of the target object, wherein each of the plurality of attributes includes one or more variations — 330

Receiving selection of one or more of a plurality of variations of the plurality of attributes — 340

Blending the one or more of the plurality of variations of the plurality of attributes that have been selected into one or more options of the target object — 350

| Attributes | Variations | | | | | | | 405 |
|---|---|---|---|---|---|---|---|---|
| Attribute 1 | v1 ✓ | v2 ✓ | v3 ✗ | v4 | v5 ✓ | v6 | v7 ✓ | ● ● ● |
| Attribute 2 | v1 | v2 ○ | v3 ✗ | v4 | v5 | v6 | v7 ✓ | ● ● ● |
| Attribute 3 | v1 ✓ | v2 | v3 | v4 ✓ | v5 ○ | v6 | v7 | ● ● ● |
| Attribute 4 | v1 ○ | v2 ✓ | v3 ✗ | v4 ✓ | v5 | v6 ✓ | v7 ✓ | ● ● ● |
| Attribute 5 | v1 ✓ | v2 | v3 | v4 ✓ | v5 | v6 ✓ | v7 | ● ● ● |
| ● ● ● | | | | | | | | |
| Attribute N | v1 ✓ | v2 ✓ | v3 | v4 ✗ | v5 ✗ | v6 | v7 | ● ● ● |

| Legend | |
|---|---|
| ✓ | Like |
| ✗ | Dislike |
| ○ | Lock |

Target Object Iteration View

| Attribute 1 v1 | Attribute 2 v2 ◯ | Attribute 3 v5 ◯ | Attribute 4 v1 ◯ | Attribute 5 v1 | ●●● | Attribute N v2 |

ASSET CREATION USING GENERATIVE ARTIFICIAL INTELLIGENCE

TECHNICAL FIELD

The present disclosure is related to creating visual assets using generative artificial intelligence, and more specifically to creating custom prompts for execution by a generative artificial intelligence system to generate a target object through an iterative process.

BACKGROUND OF THE DISCLOSURE

Video games and/or gaming applications and their related industries (e.g., video gaming) are extremely popular and represent a large percentage of the worldwide entertainment market. Video games are played anywhere and at any time using various types of platforms, including gaming consoles, desktop computers, laptop computers, mobile phones, etc.

Developing a character for a video game can be time consuming. From inception to a final version, one or more visual representations of the character are created and modified by a creative team. For example, each of the visual representations may be generated manually. In the beginning of the development cycle, the representations may be conceptual and created without many details. These early representations may be generated relatively quickly. On the other hand, as the development cycle nears the end, the representations of the character become very detailed. These later representations require more time to generate. The entire development cycle may last from a few days to many months, or even longer, until the creative team is satisfied with the final version of the character. The time it takes to develop a character impacts the development cycle of the full video game, such that taking too much time to develop the character will delay the release date of the video game.

It is in this context that embodiments of the disclosure arise.

SUMMARY

Embodiments of the present disclosure relate to the creation of visual assets using generative artificial intelligence, and more specifically by selecting and editing of determined attributes of a target object, one or more versions of the target object may be generated through an iterative process.

In one embodiment, a method is disclosed. The method including collecting one or more inputs, each of which describes a target object. The method including generating a plurality of images of the target object using an image generation artificial intelligence system configured for implementing latent diffusion based on the one or more inputs. The method including decomposing the target object into a first plurality of attributes based on the plurality of images of the target object, wherein each of the plurality of attributes includes one or more variations. The method including receiving selection of one or more of a plurality of variations of the plurality of attributes. The method including blending the one or more of the plurality of variations of the plurality of attributes that have been selected into one or more options of the target object.

In another embodiment, a non-transitory computer-readable medium storing a computer program for implementing a method is disclosed. The computer-readable medium including program instructions for collecting one or more inputs, each of which describes a target object. The computer-readable medium including program instructions for generating a plurality of images of the target object using an image generation artificial intelligence system configured for implementing latent diffusion based on the one or more inputs. The computer-readable medium including program instructions for decomposing the target object into a first plurality of attributes based on the plurality of images of the target object, wherein each of the plurality of attributes includes one or more variations. The computer-readable medium including program instructions for receiving selection of one or more of a plurality of variations of the plurality of attributes. The method including blending the one or more of the plurality of variations of the plurality of attributes that have been selected into one or more options of the target object.

In still another embodiment, a computer system is disclosed, wherein the computer system includes a processor and memory coupled to the processor and having stored therein instructions that, if executed by the computer system, cause the computer system to execute a method. The method including collecting one or more inputs, each of which describes a target object. The method including generating a plurality of images of the target object using an image generation artificial intelligence system configured for implementing latent diffusion based on the one or more inputs. The method including decomposing the target object into a first plurality of attributes based on the plurality of images of the target object, wherein each of the plurality of attributes includes one or more variations. The method including receiving selection of one or more of a plurality of variations of the plurality of attributes. The method including blending the one or more of the plurality of variations of the plurality of attributes that have been selected into one or more options of the target object.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 3 is a flow diagram illustrating a method for asset creation using generative artificial intelligence, in accordance with one embodiment of the present disclosure.

FIG. 4A illustrates an array of attributes of a target object, wherein each attribute includes one or more variations, in accordance with one embodiment of the present disclosure.

DETAILED DESCRIPTION

Figure 1A:
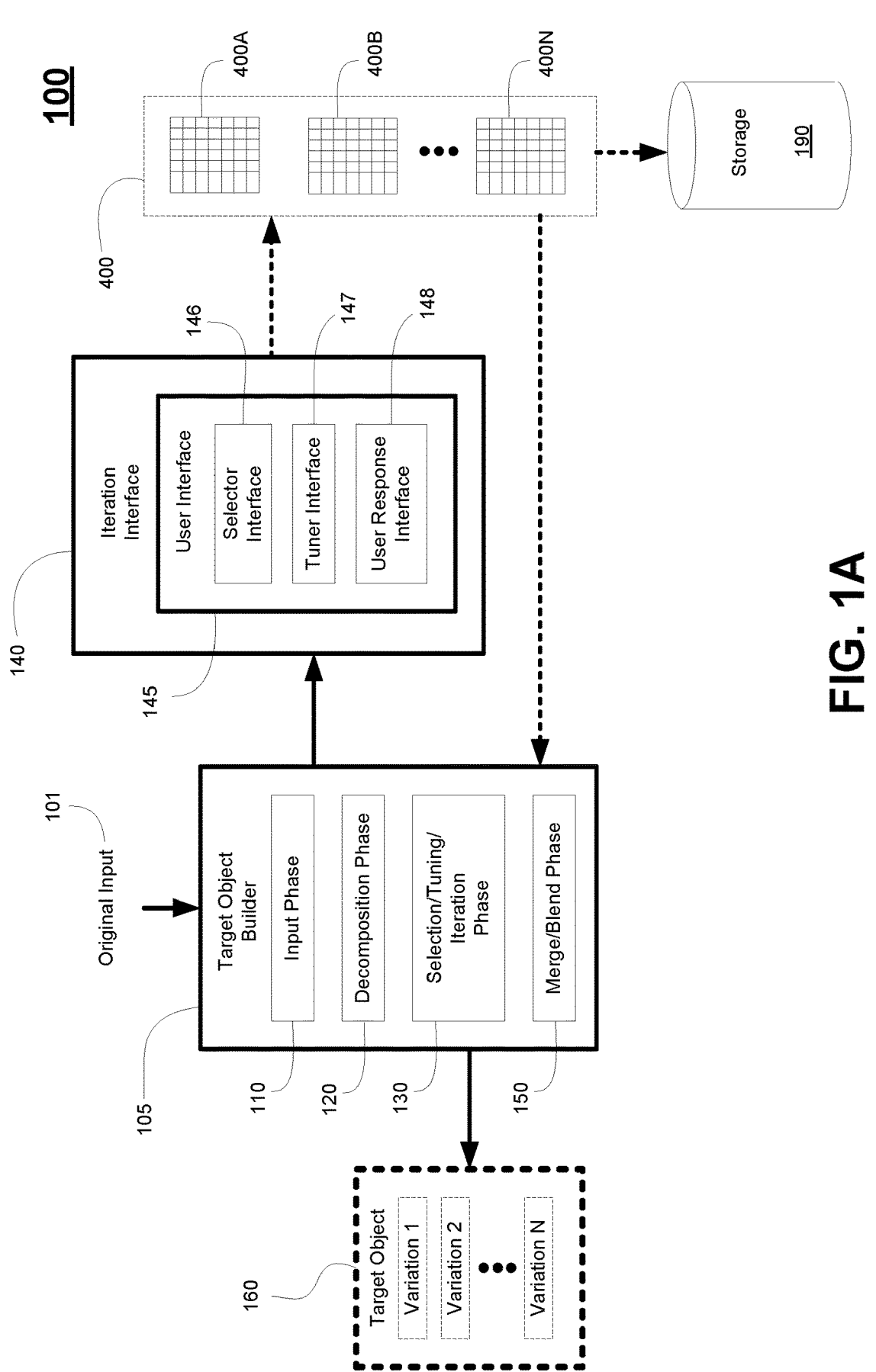
FIG. 1A illustrates a system configured for asset creation using generative artificial intelligence, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure are set forth without any loss of generality to, and without imposing limitations upon, the claims that follow this description.

Generally speaking, the various embodiments of the present disclosure describe systems and methods for the creation of visual assets using generative artificial intelligence (AI), wherein one or more versions of a target object or asset may be iteratively generated through selecting and editing of AI generated attributes of the target object. The technology proposed in embodiments of the present disclosure allows for dynamic generation of creative and visual usable content, and can be applicable to game elements in addition to other visual elements within a video game or other applications (e.g., gaming characters, animation utilizations, visual elements/assets). Multiple phases may be performed to create one or more versions of the asset, wherein the phases may also be performed iteratively. For example, the phases include an input phase configured to generate custom prompts for use by a generative AI system, a decomposition phase that identifies one or more attributes of the asset, an iteration phase for selecting, editing, and/or tuning one or more attributes and/or variations of those attributes, and a merge/blend phase to generate different permutations of the asset based on selected attributes and/or selected variations of one or more selected attributes.

Advantages of embodiments of the present disclosure include providing an intuitive and/or visual way to create a target object or asset during development, such as a character for a video game. The process used to create the target object/asset allows a user to selectively view different variations of an attribute of the target object/asset for purposes of selection, editing, and tuning. For example, a user interface may be configured to provide one or more visual interfaces enabling the selection, or editing, or tuning of each variation of a corresponding attribute. In one implementation, the user interface allows for the locking or approval of an attribute and/or a variation of the attribute. The selection and/or modifications to the variations of the attributes may be provided back to the generative AI system to generate another iteration of one or more variations of another set of attributes for the target object. As such, the user interface is configured to present the one or more variations of the attributes of the target object, and also provide to the user the ability to select and/or edit and/or tune those one or more variations of the attributes in one or iterative processes, each of which generates a new set of attributes and their corresponding variations for the target object. In addition, upon approval of the generated attributes, one or more permutations and/or versions of the target object is generated, which can be viewed in the user interface.

Throughout the specification, the reference to "game" or "video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

FIG. 1A illustrates a system 100 configured for asset and/or target object creation using generative artificial intelligence (AI) and/or AI models, in accordance with one embodiment of the present disclosure. In particular, visual assets may be created using generative artificial intelligence (AI), wherein one or more versions of a target object or asset may be iteratively generated through selecting and editing of AI generated attributes of the target object. For example, the asset or target object may be a character in a video game, and/or animation utilizations, and/or visual elements/assets that may occur in corresponding video games. Generally, embodiments of the present disclosure allows for dynamic generation of creative and visual usable content as the target object, and can be applicable to game elements, animation utilizations, and other visual elements/assets occurring within video games or other applications (e.g., gaming characters, non-player character assets, backgrounds, textural elements, world/landscape elements such as furniture or trees, etc., as well as other visual objects). For purposes of illustration only, throughout the specification, the asset that is created may be a fictional dragon. System 100 may be implemented at a back-end cloud service, or as a middle layer third party service that is remote from a client device.

As shown, original input 101 is provided to target object builder 105. In part, the target object builder 105 implements generative AI configured to build the asset or target object. More particularly, the target object builder 105 is configured to generate a plurality of attributes for the asset, wherein each of the attributes may include one or more variations. By combining different variations of the plurality of attributes, one or more permutations of the asset may be generated by the target object builder 105.

For example, the target object builder 105 may include one or more artificial intelligence processing engines and/or models for creation of the target object and/or asset, to include attribute generation. For example, an image generation AI (IGAI) system may be configured for implementing generative AI used for generating one or more output images, graphics, and/or three-dimensional representations of the asset. Additional artificial intelligence is implemented (e.g., via one or more AI models) to identify attributes of the one or more output images. In addition, because there may be multiple output images generated by the IGAI system, each attribute may include one or more variations. For example, a tail of the dragon (e.g., used generally as a representation of the desired target object) may include multiple flavors or variations, such as a long tail, short tail, stubby tail, etc. As such, artificial intelligence may be used to further identify variations of each of the attributes.

The target object builder 105 may implement multiple phases for the creation of visual assets using generative AI, wherein the phases may be implemented iteratively in order to output one or more permutations of the target object with user input. In particular, four phases may be implemented, and include an input phase 110, a decomposition phase 120 to generate an array of attributes, a selection and/or tuning and/or iteration phase 130, and a merge/blend phase 150.

In the input phase 110, custom prompts are generated based on the original input for implementation by a generative AI system, wherein the prompts are directed to the generation of the target object. The original input may be in any format, including text, audio commentary, visual images and/or sequence of images, etc. Generally, the original input may describe the desired target object, and may include further parameters that define the target object.

Furthermore, in the decomposition phase 120, the target object is decomposed into one or more attributes or components. This may be accomplished by prompting the generative AI system to generate selectable components/attributes for the target object. The prompts may further define a particular art style for the target object, such as that inferred from the original input. In one implementation, the generative AI system generates one or more representations of the target object. The generative AI system also generates different variations (e.g., one or more flavors or features or samples, etc.) for each of the components/attributes based on the one or more representations. The attributes and their variations may be presented within an array. For example, one or more AI models may be configured to identify attributes and/or variations of each attribute.

In an iteration phase 130, a user is able to select, edit and/or tune each of the one or more variations of each of the components/attributes. In particular, a user can focus in on a particular component/attribute, and more specifically the variations of the component/attribute, for additional modification using prompts. In particular, during the iteration phase, selection and/or editing and/or tuning of variations of attributes of the target object is enabled. Further, modification of the variations of the attributes are provided back to the target object builder 105 in order to generate another iteration of attributes (i.e., a new set of attributes), each of which includes one or more variations that are also generated using generative AI. For example, a plurality of arrays of attributes 400 is generated in different iterations, to include array 400A in a first iteration, array 400B in a second iteration, on up to array 400N in an Nth iteration.

For example, there may be an iteration interface 140 configured to facilitate user interaction for purposes of selecting, editing and/or tuning variations of the attributes. The iteration interface 140 includes a user interface 145 configured to enable interaction by a user. Different features may be provided by the user interface, such as a selector interface 146 configured for selection of an attribute and/or a variation of a corresponding attribute, a tuner interface 147 configured for tuning an attribute and/or a variation of a corresponding attribute, and a user response interface 148 configured to enable a desired action to be performed by the target object builder 105 by the user, such as perform another iteration, or generate one or more permutations of the target object based on selected attributes and/or selected variations of corresponding attributes.

As such, the variations of each of the components/attributes can be uniquely arranged (e.g., array) and/or selectable to generate different permutations of the target object in a merge blend phase 150. In that manner, target object/asset with different permutations or versions may be created using generative AI and/or AI models. For example, at the end of the iterations, a merge and/or blend phase 150 is implemented to generate one or more permutations and/or variations of the target object 160. As such, the target object may include a first variation or permutation, a second variation or permutation, on up to an Nth variation or permutation. Storage 190 may be configured for storing the permutations of the target object, and/or each of the attributes of the representations and/or iterations of the target object that were generated during the process, and/or each of the variations of the attributes of the representations and/or iterations of the target object.

Figure 1B:
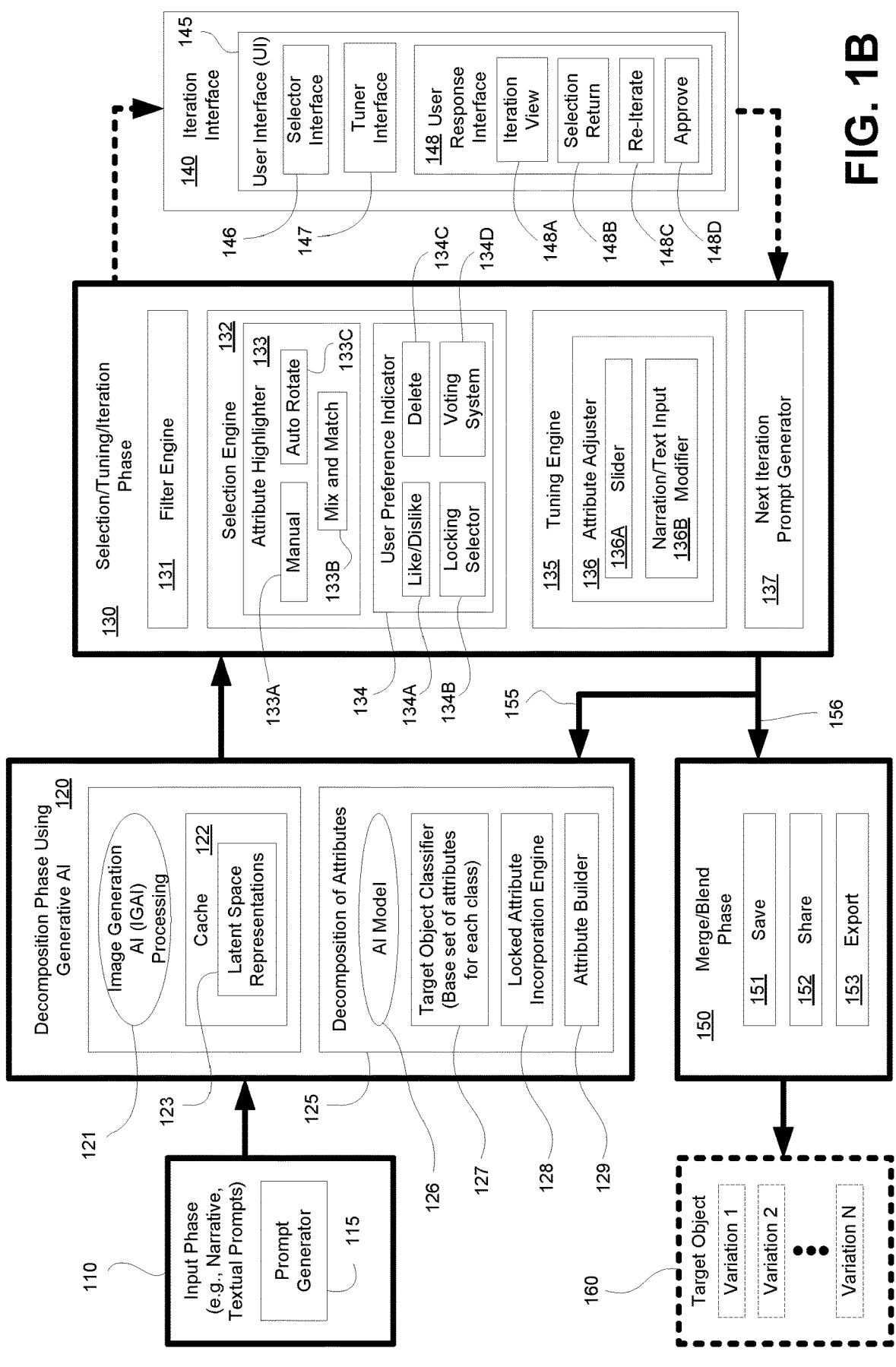
FIG. 1B illustrates a different phases for asset creation implemented by a system configured for asset creation using generative artificial intelligence, in accordance with one embodiment of the present disclosure.

FIG. 1B provides additional detail for system 100 as introduced in FIG. 1A, and more particularly describes the multiple phases of asset creation performed by the target object builder 101, in accordance with one embodiment of the present disclosure. Generative AI is performed by system 100 to create visual assets using generative AI, wherein one or more versions of a target object or asset may be iteratively generated through selecting and editing of AI generated attributes of the target object. For example, system 100 is configured for dynamic generation of creative and visual usable content, and can be applicable to game elements in addition to other visual elements within a video game or other applications (e.g., gaming characters, animation utilizations, visual elements/assets, etc.).

A custom prompt is generated in the input phase 110 based on the original input 101 provided to the target object builder 105. As previously described, the original input may be provided by a user and describes the target object and desired features of the target object. For example, the user may provide the original input using any communication means, such as text, audio, photos, etc. For illustration purposes only, the original input may be directed to a desired target object, which may be a dragon. The original input may provide details as to features of the dragon, such as overall attitude of the dragon, desired facial and other body features, etc. The original input may also include an artistic style, such as a Far Eastern influenced dragon, or a European influenced dragon. More particularly, the prompt generator 115 receives the original input 101, and generates a custom prompt in the format suitable for use by the target object builder 105 implementing generative AI services.

In some implementations, the prompt generator 115 is incorporated into the generative AI system, such as IGAI 121. For example, the IGAI 121 can be customized to enable entry of unique descriptive language statements to set a style for the requested output images or content. The descriptive language statements can be text or other sensory input, e.g., inertial sensor data, input speed, emphasis statements, and other data that can be formed into an input request. The IGAI can also be provided images, videos, or sets of images to define the context of an input request. In one embodiment, the input can be text describing a desired output along with an image or images to convey the desired contextual scene being requested as the output.

The custom prompt is used for the decomposition phase 120 that is configured for attribute generation, wherein the target object includes one or more attributes. The custom prompt may be provided to an IGAI 121 configured for implementing generative AI to generate one or more output images, graphics, and/or three-dimensional representations of the target object. The IGAI may include one or more artificial intelligence processing engines and/or models that are trained and/or curated for specific desired outputs and in some cases the training data set can include wide ranging generic data that can be consumed from a multitude of sources over the Internet. By way of example, an IGAI should have access to a vast of amount of data, e.g., images, videos and three-dimensional data. The generic data is used by the IGAI to gain understanding of the type of content desired by an input. For instance, if the input is requesting the generation of a dragon, the data set should have various images of dragons to access and draw upon during the processing of an output image. The curated data set, on the other hand, maybe be more specific to a type of content, e.g., video game related art, videos and other asset related content. Even more specifically, the curated data set could include images related to specific scenes of a game or actions sequences including game assets, e.g., unique avatar characters and the like.

In one embodiment, an IGAI 121 is provided to enable text-to-image generation. Image generation is configured to implement latent diffusion processing, in a latent space, to synthesize the text to image processing. In one embodiment, a conditioning process assists in shaping the output toward the desired using output, e.g., using structured metadata. The structured metadata may include information gained from the user input to guide a machine learning model to denoise progressively in stages using cross-attention until the processed denoising is decoded back to a pixel space. In the decoding stage, upscaling is applied to achieve an image, video, or 3D asset that is of higher quality. The IGAI is therefore a custom tool that is engineered to processing specific types of input and render specific types of outputs. When the IGAI is customized, the machine learning and deep learning algorithms are tuned to achieve specific custom outputs, e.g., such as unique image assets to be used in gaming technology, specific game titles, and/or movies.

In another configuration, the IGAI 121 can be a third-party processor, e.g., such as one provided by Stable Diffusion or others, such as OpenAI's GLIDE, DALL-E, Mid-Journey or Imagen. In some configurations, the IGAI can be used online via one or more Application Programming Interface (API) calls. It should be understood that reference to available IGAI is only for informational reference. For additional information related to IGAI technology, reference may be made to a paper published by Ludwig Maximilian University of Munich titled "*High-Resolution Image Synthesis with Latent Diffusion Models*", by Robin Rombach, et al., pp. 1-45. This paper is incorporated by reference.

In particular, IGAI 121 generates one or more representations and/or versions of the target object, for example, in each iteration of building the target object. The latent space representations 123 of each of these representations/versions of the target object is stored in cache 122. In that manner, each iteration of the target object may build upon previous iterations of the target object through the use of latent space representations or portions thereof.

The decomposition phase 120 includes the decomposition of attributes 125, wherein additional AI is implemented (e.g., via one or more AI models) to identify attributes of the one or more output images previously generated for the target object by IGAI 121. For example, AI model 126 is configured for classification and/or identification of attributes of each of the generated representations of the target object using artificial intelligence and/or deep/machine learning. The AI model 126 may be assisted by a target object classifier 127, that is configured to identify a general class or type for the target object. The general class may include a base set of attributes. For example, the target object may be classified as a dragon, and a base set of attributes for the dragon may include a head, a body, wings, arms and legs, and a tail.

As such, the attribute builder 129 is configured to build a detailed set of attributes identified from the representations of the target object generated through the IGAI 121, wherein the detailed set may include more attributes than the base set. That is, the attribute builder may arrange the different variations (e.g., one or more flavors or features or samples, etc.) for each of the components/attributes of the target object within an array. The array may be built for each iteration of building the target object.

One illustration of the array is provided in FIG. 4A, which illustrates an array 400N of attributes of a target object (e.g., dragon), wherein each attribute includes one or more variations, in accordance with one embodiment of the present disclosure. In particular, the array includes a column 401 of one or more attributes, and a column showing one or more variations 405 of each of the attributes. For example, the array 400N may include attributes 1 through N. In the array, each attribute may include one or more variations. For example, attribute 1 includes variations 1 through N (i.e., v1, v2, . . . vN). A legend 410 illustrates various user interactions, including a "like" interaction, a "dislike" interaction, and a "lock" interaction. Other interactions may also be supported.

Further, the locked attribute incorporation engine 128 is used for generating the next iteration of attributes. In particular, within the array of attributes and variations of the attributes, a user may lock desired attributes and/or a variation of a corresponding attribute. In that manner, a locked variation of a corresponding attribute is provided as input back into the IGAI 121 in the next iteration of building the target object, such that each of the newly built versions and/or representations of the target object will include the locked variation of a corresponding attribute, or at least a version of the locked variation that is consistent with other attributes of a corresponding representation of the target object.

As previously described, the iteration phase 130 is configured to enable selection, editing, and/or tuning of each of the one or more variations of the one or more attributes of the target object (e.g., at each iteration). The iteration phase 130 may include a filter engine 131, a selection engine 132, a tuning engine, and a prompt generator 137 configured to generate a prompt used in the next iteration of building one or more representations of the target object.

A filter engine 131 may be implemented during the decomposition phase 120, such as during generation of the array, and/or during the iteration phase 130. The filter engine 131 is configured to filter out attributes and/or certain variations of a corresponding attribute based on defined parameters. For example, the filter engine 131 may filter out offensive variations of an attribute, or variations that are inconsistent with a particular context (e.g., happy influences for a dragon that is desired to be ominous and imposing).

The selection engine 132 is configured to generate and provide one or more interfaces for the selection, editing, and/or tuning by a user for each of the one or more variations of the one or more attributes of the target object. In that manner, variations of corresponding attributes can be edited and/or manipulated via the selection engine 132. One or more interfaces generated by the selection engine 132 are presented via the iteration interface 140, which is configured to facilitate user interaction. In particular, a user interface 146 enables user interaction, and includes a selector interface 146 working in cooperation with the selection engine 132, and a tuner interface 147 working in cooperation with the tuning engine 135.

In particular, the selection engine 132 is configured to generate an attribute highlighter 133. For example, one or more attributes and/or variations of corresponding attributes may be highlighted for additional interaction by the user, such as via the selector interface 146. The highlighting may be performed to bring attention to the user particular attributes and/or variations of those attributes, or may be performed in response to user interaction indicating that the user desires to view and/or interact with an attribute or a variation of the attribute. For purposes of illustration, in the interface including an array 400N shown in FIG. 4A, variation N of attribute 3 is highlighted in block 420, which may enable further interaction by a user.

For purposes of illustration, the auto-rotate interface 133C is configured to automatically present to the user one or more attributes and their variations, such as via the selector interface 146. That is, the user is presented on a display with an image of a possible iteration of the target object that includes one or more attributes, each with a user or automatically selected variation. During auto-rotation, variations of one or more attributes may be rotated in and out. In that manner, multiple iterations of the target object may be shown to the user. In one implementation, the user may select which attributes and/or their variations are rotated, so that the user can quickly view the selected items.

Figures 4B, 4C:
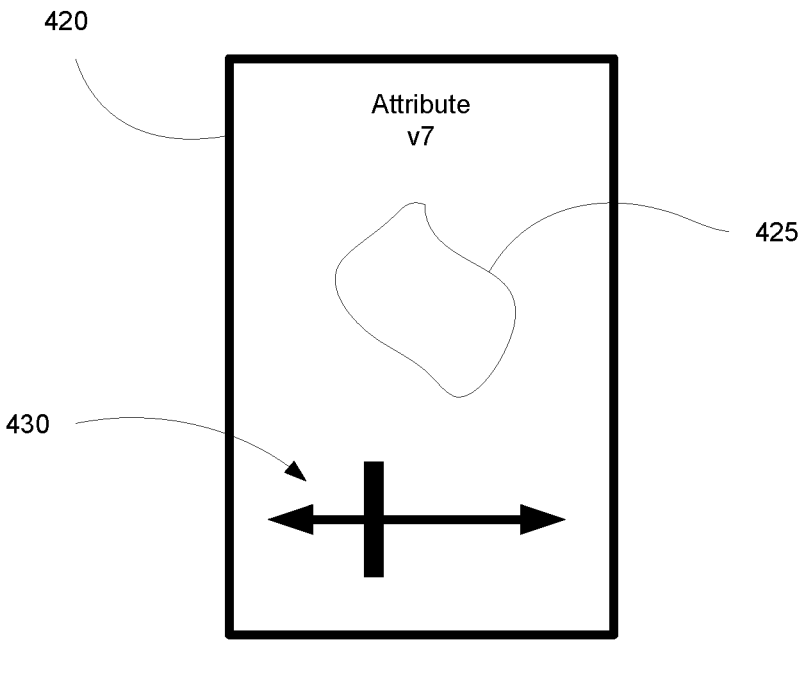
FIG. 4B illustrates the editing of a variation of an attribute of a target object using a slider, in accordance with one embodiment of the present disclosure.
FIG. 4C illustrates a visual presentation of an iteration of a target object selectable by a user, in accordance with one embodiment of the present disclosure.

Also for purposes of illustration, the manual interface 133A is configured to enable the user to select one or more attributes and their variations, and may be implemented via the selector interface 146. For example, the array including attributes and their variations may be presented to the user, such that the user is able to select one or more variations of corresponding attributes for viewing. That is, multiple iterations of the target object, each including different sets of variations of attributes, may be shown to the user. For example, FIG. 4C provides an illustration of attributes and their corresponding variations used for a particular iteration of a target object that may be presented to a user, as further described below.

Further, for purposes of illustration, the mix and match interface 133B is configured to enable the user to select and view desired iterations of the target object, and may be implemented via the selector interface 146. For example, when the user has narrowed selection of attributes and/or variations of corresponding attributes to a manageable number, the mix and match interface 133B may present to the user a summary of those attributes and their variations (e.g., through thumbnails), and the ability to view different permutations or versions of the target object through selection of specific combinations of variations of attributes. That is, a dragon may be shown with a first set of attributes, each with a selected variation. The user is able to select a variation, and substitute that variation with another variation, with the result immediately updated on the dragon as displayed. The user may continually mix and match between variations of attributes to quickly view multiple iterations of the target object.

Furthermore, the selection engine 132 includes a user preference indicator 134 that enables a user to indicate a preference or a non-preference, etc. for a corresponding variation of a corresponding attribute, such as via the selector interface 146. For example, the information regarding user preferences for one or more variations of corresponding attributes may be used to provide to the user one or more sample iterations of the target object (e.g., the dragon). In another example, the user preferences may be used in the next iterative process to generate the next iteration of the array of attributes and their variations. That is, the user preferences for each of the variations of corresponding attributes may be used for the next iteration of the process for creating a target object.

For purposes of illustration, the like/dislike feature/interface 134A is configured to enable the user to provide a "like" and/or a "dislike" for one or more variations of corresponding attributes, such as via the selector interface 146. For example, the interface may provide an array of attributes and their variations for user interaction. Within the array, the user is able to select a variation of a corresponding attribute, and provide a "like" or "dislike" indication (e.g., a checkmark for a "like" or an "x-mark" for a dislike. This may be performed one or more times for one or more attributes and/or one or more variations of corresponding attributes. For purposes of illustration, in the interface including an array 400N shown in FIG. 4A, multiple variations of corresponding attributes have been selected and given a user preference. For example, variations v1, v2, and vN of attribute 1 have been selected and "liked" by a user, as indicated with a corresponding checkmark. Also, variation 3 (v3) has been selected and "disliked" by the user, as indicated with a corresponding x-mark. Other user preferences are also indicated for one or more attributes shown in the array (e.g., attribute N has "like" indications for variations v1 and v2, and "dislike" indications for variations v4 and v5). In addition, an attribute and/or a variation of a corresponding attribute may not have a user preference, such as shown in attribute 5, variations v2, v3, v5, and vN.

For purposes of illustration, the delete feature/interface 134C of the selection engine 132 is configured to enable the user to indicate a vigorous dislike for an attribute and/or a variation of a corresponding attribute, such as via the selector interface 146. For example, the interface shown in FIG. 4A may provide the array 400N of attributes and their iterations, and further allow the user to select a variation of a corresponding attribute for deletion. This may be performed one or more times for one or more attributes and/or one or more variations of corresponding attributes. For example, variation 5 of attribute 4 has been selected and deleted.

For purposes of illustration, the locking selector feature/interface 134B of the selection engine 132 is configured to enable the user to lock in an attribute and/or a variation of a corresponding attribute, such as via the selector interface 146. In one implementation, an attribute may only have one variation that is locked. In other implementations, an attribute may have one or more variations that can be locked. For example, the interface shown in FIG. 4A may provide the array 400N of attributes and their iterations, and further allow the user to select a variation of a corresponding attribute for locking. This may be performed multiple times for multiple attributes and/or variations of corresponding attributes. For example, variation 2 of attribute 2 has been locked, variation 5 of attribute 3 has been locked, and variation 1 of attribute 4 has been locked.

In one embodiment, a user may elect to view an iteration or permutation of the target object. In that manner, the user is able to determine whether to continue with a direction for creating the target object or move in a different direction. For purposes of illustration, the manual interface 133A may be configured to enable the user to select one or more attributes and their variations, and may be implemented via the selector interface 146. For example, the array including attributes and their variations may be presented to the user, such that the user is able to select one or more variations of corresponding attributes for viewing. That is, multiple iterations of the target object, each including different sets of variations of attributes, may be shown to the user. In addition, one or more iterations may be presented automatically for viewing based on one or more of the variations of corresponding attributes that have been preferentially selected and/or edited by the user. An iteration may be selected for viewing via the iteration view interface 148A of the user response interface 148.

For example, FIG. 4C illustrates a visual presentation of one or more variations of one or more attributes for an iteration view 440 of a target object (e.g., dragon), wherein the variations of attributes may be selected by a user, such as via the iteration view interface 148A, in accordance with one embodiment of the present disclosure. The attributes and their variations may follow the array 400N of the target object. That is, the target object includes N attributes, each with a corresponding variation that is selected and/or influenced by user selection. In particular, the iteration view 440 includes locked attributes. For example, the iteration view 440 includes variation 2 of attribute 2, variation 5 of attribute 3, and variation 1 of attribute 4 that are locked by the user, as previously described in array 400N. In addition, remaining attributes for the iteration view 440 includes variation 1 of attribute 1, variation 1 of attribute 5, and variation 2 of attribute N. The remaining attributes for target object shown in iteration view 440 may be selected by the user, or may be influenced by user selection. That is, the user may actively select the variation of a corresponding attribute for viewing. Also, for those attributes that the user has not actively selected for viewing in the iteration 440, a variation of a corresponding attribute may be automatically selected based on user preferences. For example, the user has not locked in a variation for attribute 1, but has liked multiple variations (e.g., variations 1, 2, 5, . . . and N) and deleted one variation (e.g., variation 5). Because the user has not selected a variation of attribute 1 for the iteration view 440, a variation may be automatically selected (e.g., variation 1). That is, a preferred variation for attribute 1 (e.g., "liked", not including deleted variations, etc.) may be randomly selected for the iteration view 440, such as variation 1 of attribute 1, which is consistent with array 400N.

For purposes of illustration, the voting system feature/interface 134D of the selection engine 132 is configured to enable a user to vote on attributes and/or variations of corresponding attributes in a group setting, such as via the selector interface 146. For purposes of illustration only, attributes and/or variations of corresponding attributes that have been "liked" by a corresponding user may correspond with votes for those "liked" selections, such as those shown in array 400N of FIG. 4A. Other methods for selecting attributes and or variations of corresponding attributes may be supported, such as through commentary, etc. In that manner, once voting has been performed by members of a group (e.g., design group working on a character for a video game), preferences of the group may be determined based on the popularity of attributes and/or variations of corresponding attributes. One or more versions of the target object can be built and viewed, wherein each version includes a unique set of one or more variations of corresponding attributes (e.g., a variation for each attribute). In addition, the one or more versions of the target object built by the preferences of the group may be shown via the mix and match feature/interface 133B, previously described.

The tuning engine 135 is configured to generate and provide one or more interfaces for enabling the editing by a user for each of the one or more variations of the one or more attributes of a target object. One or more interfaces generated by the tuning engine 135 are presented via the tuner interface 147, which is configured for user interaction.

For example, the tuning engine 135 includes an attribute adjuster 136, which is configured to enable editing by a user, via the tuner interface 147. In one implementation, the attribute adjuster 136 includes a slider 136A, which is configured to provide for selection and tuning of a variation of a corresponding attribute. For example, selection of a variation of a corresponding attribute may be made via the interface showing array 400N in FIG. 4A, such as variation N of attribute 3, shown in highlighted block 420 for purposes of further user interaction. For purposes of illustration only, FIG. 4B illustrates the editing of a variation of an attribute of a target object using a slider 430, in accordance with one embodiment of the present disclosure. As shown, object 425 is a representation of the variation N of attribute 3. Slider 430 enables the user to modify variation N of attribute 3, wherein modifications are reflected in the viewed object 425. For example, the slider 430 may allow for modification of one or more parameters of variation N of attribute 3. For purposes of illustration, modification may include making object 425 thinner or thicker in the vertical direction, uniformly smaller or larger, darker or lighter, etc.

More than one method for modifying a variation of a corresponding attribute are supported. For example, after selection of a variation of a corresponding attribute, modification of an aspect of the variation of the corresponding attribute may be performed using the narration/text input modifier 136B. That is, the user may provide commentary (i.e., via text or narration) that is descriptive of desired modifications to the variation of a corresponding attribute, such as modifications to the object 425 shown in the block 420 highlighting variation N of attribute 3. The modifications to the variation of the corresponding attribute may be performed by an AI model, such as one implementing generative AI, in one embodiment. As such, the commentary may be encoded (e.g., using an encoder) into a text prompt supported by the AI model.

As is shown, the iteration interface 140 includes a user response interface 148 configured to enable selection of one or more actions to be performed by system 100 when creating a target object, including multiple interfaces: an iteration view 148A, a selection return 148B, a re-iterate 148C, and approval 148D.

In particular, the iteration view interface 148A provides a visual representation of a target object including attributes and their corresponding attributes. That is, a representation of a target object (e.g., dragon) is generated and displayed, wherein the representation includes one or more attributes and their corresponding variations. Interface 148A, may also enable selection of attributes and their corresponding variations to the user. For example, the attributes and their corresponding variations may be selected by the user, or influenced by user preferences, as is shown in a corresponding iteration view (e.g., iteration view 440 of FIG. 4C).

Also, the selection return interface 148B enables the user to return to the iteration phase 130 of the system 100. In particular, the user may elect to return back to the selection engine 132 to enable selection, deletion, and/or editing of attributes and/or variations of attributes, for example as enabled via the attribute highlighter 133 and/or the user preference indicator 134.

Further, the re-iterate interface 148C enables the user to initiate another iteration of the target object. Specifically, the user actions including the selection (e.g., locking, non-selection, indifference, etc.), deletion, and/or editing of attributes and/or variations of attributes are used to generate another set of attributes and one or more variations for each of the attributes. That is, the user actions regarding the attributes and/or variations of attributes are provided back to the IGAI engine 121 in order to generate another iteration of one or more representations of the target object. In particular, the next iteration prompt generator 137 is configured to consider the user actions regarding the attributes and/or variations of attributes received from the previous iteration and generate a prompt suitable for input into the IGAI engine 121 to generate one or representations of the target object for the next iteration. As such, another iteration of an array of attributes and their corresponding variations (i.e., a new set of attributes and their variations) are generated using generative AI (e.g., one of the arrays 400A through 400N in FIG. 1A).

Also, the approve interface 148D is configured to generate a final output for the target object. Specifically, approval by the user of the various selections (e.g., lock, non-selection, ignore, etc.), deletions, and/or edits of attributes and/or variations of corresponding attributes initiates the next phase of the creation of the target object. As such, the merge/blend phase 150 is performed after approval of the user. For example, a final version 160 of the target object may include one or more representations or variations, such as representation/variation 1, representation/variation 2, . . . , representation/variation N. Each of these representations/variations may be presented for selection by a user for incorporation into a video game, as an illustration.

The save engine 151 is configured to save each of the attributes and their corresponding variations. One or more of the variations of corresponding attributes may be shared with other users via the share engine 152. In addition, one or more variations of corresponding attributes may be exported via the export engine 153 to other in-party or proprietary services and/or applications, or third party services and/or applications. For example, the attributes and their corresponding attributes used to build one or more representations of a final version of the target object may be used by other services. In that manner, the representations of the final version of the target object may be used by these other services.

Figure 2A:
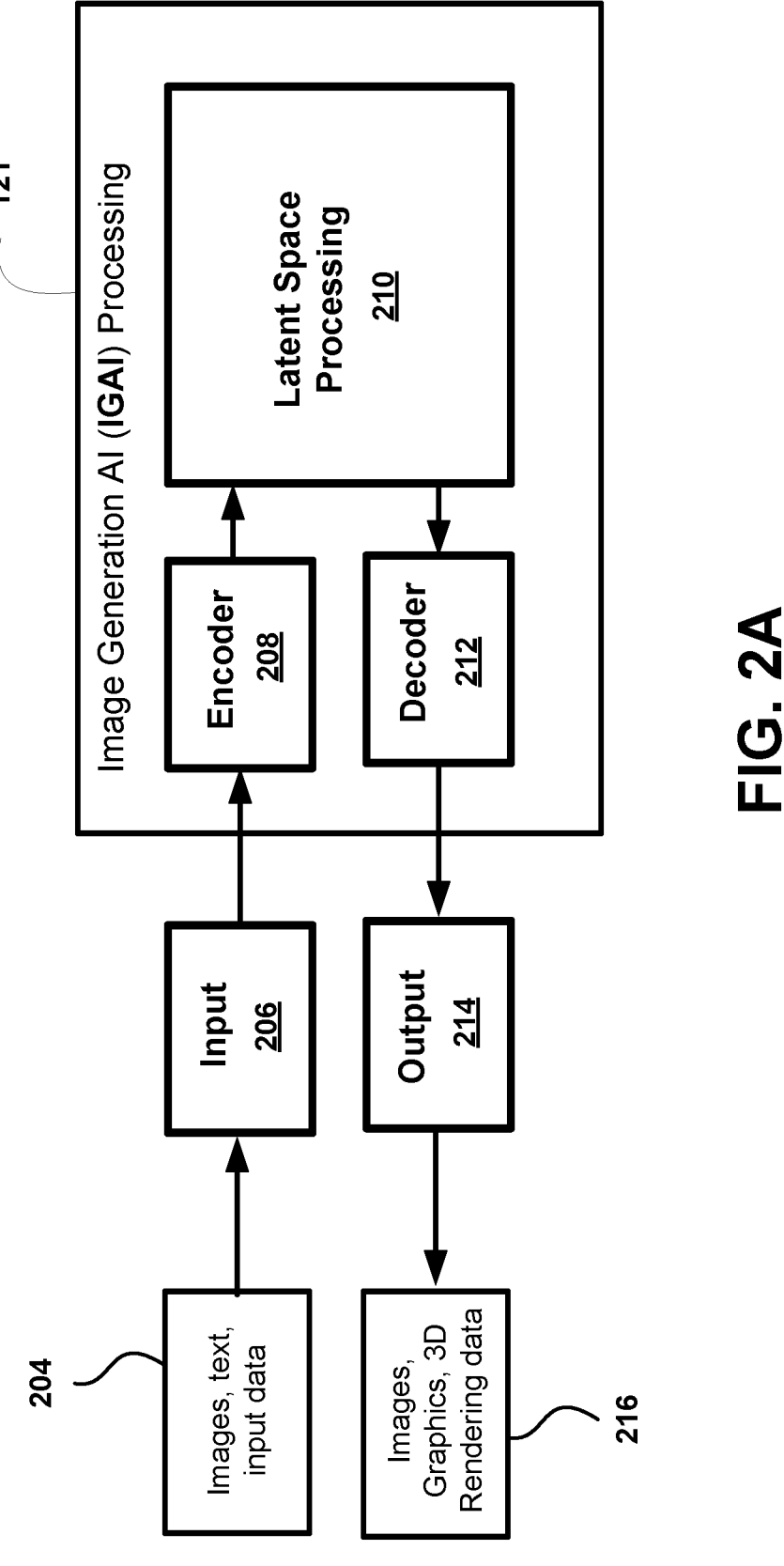
FIG. 2A is a general representation of an image generation AI (IGAI) processing sequence, in accordance with one embodiment.

FIG. 2A is a general representation of an image generation AI (IGAI) processing sequence, for example, as implemented by the IGAI processing engine 121 implementing generative AI, in accordance with one embodiment. As shown, input 206 is configured to receive input in the form of data, e.g., text description having semantic description or key words. The text description can in the form of a sentence, e.g., having at least a noun and a verb. The text description can also be in the form of a fragment or simply one word. The text can also be in the form of multiple sentences, which describe a scene or some action or some characteristic. In some configuration, the input text can also be input in a specific order so as to influence the focus on one word over others or even deemphasize words, letters or statements. Still further, the text input can be in any form, including characters, emojis, ions, foreign language characters (e.g., Japanese, Chinese, Korean, etc.). In one embodiment, text description is enabled by contrastive learning. The basic idea is to embed both an image and text in a latent space so that text corresponding to an images maps to the same area in the latent space as the image. This abstracts out the structure of what it means to be a dog for instance from both the visual and textual representation. In one embodiment, a goal of contrastive representation learning is to learn an embedding space in which similar sample pairs stay close to each other while dissimilar ones are far apart. Contrastive learning can be applied to both supervised and unsupervised settings. When working with unsupervised data, contrastive learning is one of the most powerful approaches in self-supervised learning.

In addition to text, the input can also include other content, e.g., such as images or even images that have descriptive content themselves. Images can be interpreted using image analysis to identify objects, colors, intent, characteristics, shades, textures, three-dimensional representations, depth data, and combinations thereof. Broadly speaking, the input 206 is configured to convey the intent of the user that wishes to utilize the IGAI to generate some digital content. In the context of game technology, the target content to be generated can be a game asset for use in a specific game scene. In such a scenario, the data set used to train the IGAI 121 and input 206 can be used to customized the way artificial intelligence, e.g., deep neural networks process the data to steer and tune the desired output image, data or three-dimensional digital asset.

The input 206 is then passed to the IGAI 121, where an encoder 208 takes input data and/or pixel space data and coverts into latent space data. The concept of "latent space" is at the core of deep learning, since feature data is reduced to simplified data representations for the purpose of finding patterns and using the patterns. The latent space processing 210 is therefore executed on compressed data, which significantly reduces the processing overhead as compared to processing learning algorithms in the pixel space, which is much more heavy and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI. In latent space processing 210, a diffusion process is computed using diffusion models. Latent diffusion models rely on autoencoders to learn lower-dimension representations of a pixel space. The latent representation is passed through the diffusion process to add noise at each step, e.g., multiple stages. Then, the output is fed into a denoising network based on a U-Net architecture that has cross-attention layers. A conditioning process is also applied to guide a machine learning model to remove noise and arrive at an image that represents closely to what was requested via user input. A decoder 212 then transforms a resulting output from the latent space back to the pixel space. The output 214 may then be processed to improve the resolution. The output 214 is then passed out as the result, which may be an image, graphics, 3D data, or data that can be rendered to a physical form or digital form.

Figure 2B:
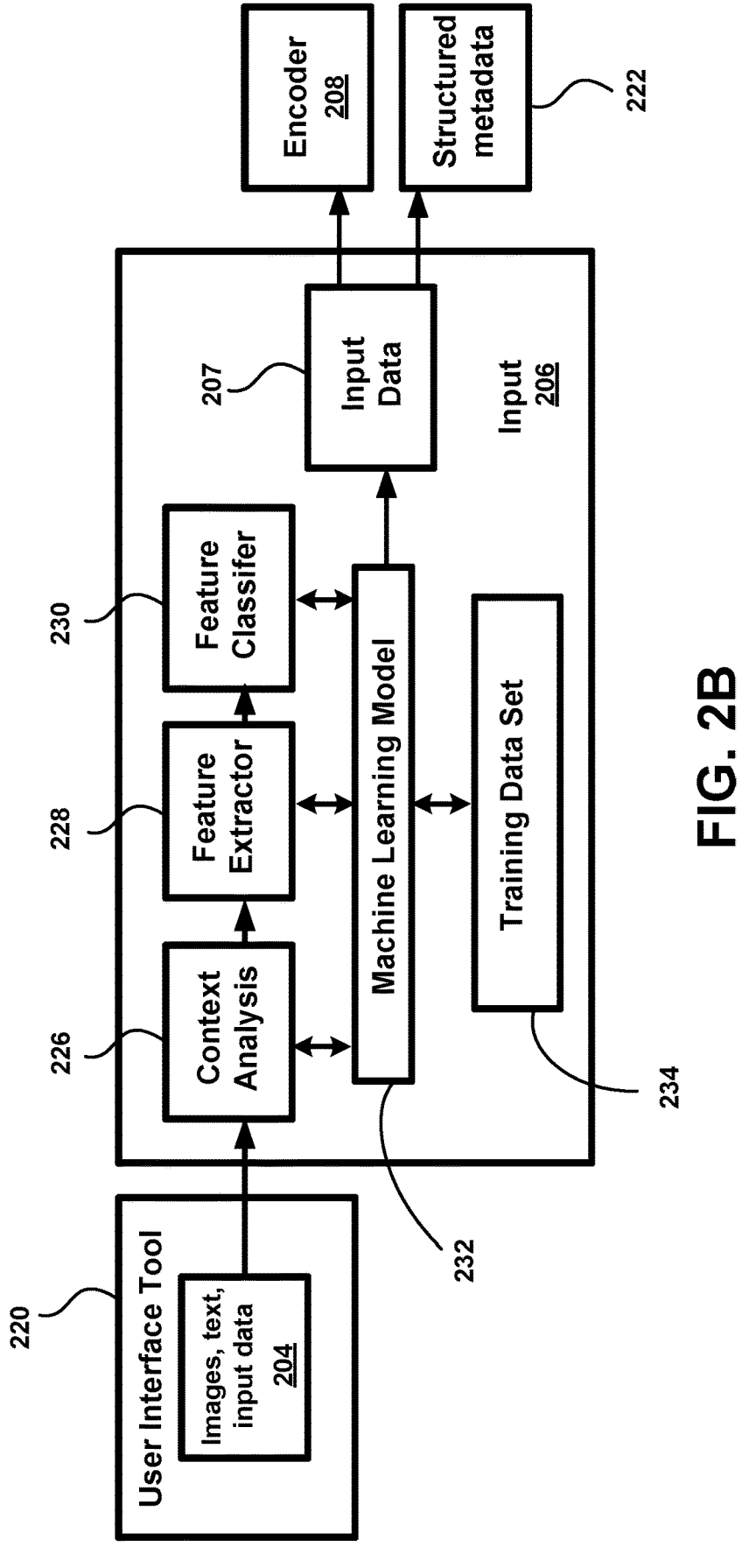
FIG. 2B illustrates additional processing that may be done to the input provided to the IGAI processing sequence described in FIG. 2A, in accordance with one embodiment of the present disclosure.

FIG. 2B illustrates, in one embodiment, additional processing that may be done to the input 206. A user interface tool 220 may be used to enable a user to provide an input request 204. The input request 204, as discussed above, may be images, text, structured text, or generally data. In one embodiment, before the input request is provided to the encoder 208, the input can be processed by a machine learning process that generates a machine learning model 232, and learns from a training data set 234. By way of example, the input data maybe be processed to via a context analyzer 226 to understand the context of the request. For example, if the input is "space rockets for flying to the mars", the input can be analyzed 226 to determine that the context is related to outer space and planets. The context analysis may use machine learning model 232 and training data set 234 to find related images for this context or identify specific libraries of art, images or video. If the input request also includes an image of a rocket, the feature extractor 228 can function to automatically identify feature characteristics in the rocket image, e.g., fuel tank, length, color, position, edges, lettering, flames, etc. A feature classifier 230 can also be used to classify the features and improve the machine learning model 232. In one embodiment, the input data 207 can be generated to produce structured information that can be encoded by encoder 208 into the latent space. Additionally, it is possible to extract out structured metadata 222 from the input request. The structed metadata 222 may be, for example, descriptive text used to instruct the IGAI 121 to make a modification to a characteristic or change to the input images or changes to colors, textures, or combinations thereof. For example, the input request 204 could include an image of the rocket, and the text can say "make the rocket wider" or "add more flames" or "make it stronger" or some of other modifier intended by the user (e.g., semantically provided and context analyzed). The structured metadata 222 can then be used in subsequent latent space processing to tune the output to move toward the user's intent. In one embodiment, the structured metadata may be in the form of semantic maps, text, images, or data that is engineered to represent the user's intent as to what changes or modifications should be made an input image or content.

Figure 2C:
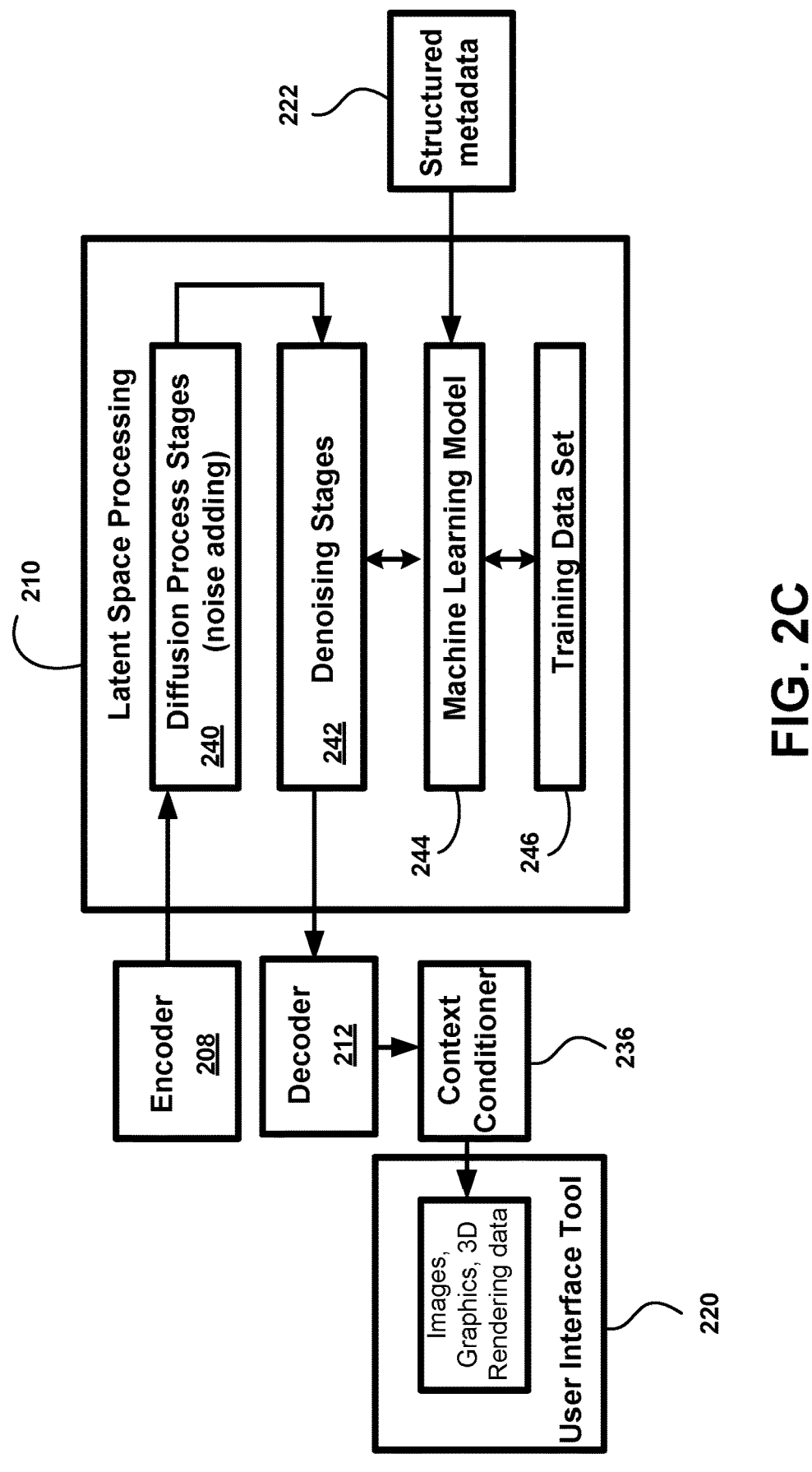
FIG. 2C illustrates how the output of the encoder used is then fed into latent space processing in the IGAI processing sequence, in accordance with one embodiment.

FIG. 2C illustrates how the output of the encoder 208 is then fed into latent space processing 210, in accordance with one embodiment. A diffusion process is executed by diffusion process stages 240, wherein the input is processed through a number of stages to add noise to the input image or images associated with the input text. This is a progressive process, where at each stage, e.g., 10-50 or more stages, noise is added. Next, a denoising process is executed through denoising stages 242. Similar to the noise stages, a reverse process is executed where noise is removed progressively at each stage, and at each stage, machine learning is used to predict what the output image or content should be, in light of the input request intent. In one embodiment, the structured metadata 222 can be used by a machine learning model 244 at each stage of denoising, to predict how the resulting denoised image should look and how it should be modified. During these predictions, the machine learning model 244 uses the training data set 246 and the structured metadata 222, to move closer and closer to an output that most resembles the requested in the input. In one embodiment, during the denoising, a U-Net architecture that has cross-attention layers may be used, to improve the predictions. After the final denoising stage, the output is provided to a decoder 212 that transforms that output to the pixel space. In one embodiment, the output is also upscaled to improve the resolution. The output of the decoder, in one embodiment, can be optionally run through a context conditioner 236. The context conditioner is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner can make adjustments with in-painting processes or overlays to correct or block the inconsistent or undesired outputs. However, as the machine learning model 244 gets smarter with more training over time, there will be less need for a context conditioner 236 before the output is rendered in the user interface tool 220.

With the detailed description of the system 100 of FIGS. 1A-1B, flow diagram 300 of FIG. 3 discloses a method for asset or target object creation using generative artificial intelligence, in accordance with one embodiment of the present disclosure. In particular, the operations performed in the flow diagram may be implemented by one or more of the previously described components through the section and editing of attributes and their corresponding variations of the target object. In some embodiments, the method of flow diagram 300 allows for dynamic generation of creative and visual usable content, and can be applicable to game elements in addition to other visual elements within a video game or other applications (e.g., gaming characters, animation utilizations, visual elements/assets, etc.).

At 310, the method includes collecting one or more inputs, each of which describes a target object. The inputs may include text, commentary, images, etc. The collected input may be used to generate a custom prompt to direct a generative AI system to create an asset or target object, such as a character used in a video game. More specifically, the custom prompt is generated in a format that is suitable for use by the generative AI system to perform one or more iterations of creating the target object.

At 320, the method includes generating a plurality of images of the target object using an image generation artificial intelligence system configured for implementing latent diffusion based on the one or more inputs that are collected. In particular, the generative AI system is configured to generate multiple images of the target object based on the collected input. For example, the previously generated prompt is input to the generative AI system to generate multiple images and/or representations of the target object, instead of outputting one image or representation. These representations are used for attribute generation of the target object.

At 330, the method includes decomposing the target object into a plurality of attributes based on the plurality of images of the target object, wherein each of the plurality of attributes includes one or more variations. In particular, the plurality of images/representations of the target object is input to an AI model that is configured to extract the plurality of attributes. More particularly, each of the representations of the target object output by the generative AI system includes attributes. For example, a dragon that is representative of the target object being created may include attributes, such as a tail, a face, a mouth capable of spewing fire, a belly, arms, wings, etc. As such, the multiple representations of the target object may include similar sets of attributes (e.g., where the same attributes are included in each set), or may include slightly different sets of attributes (e.g., where each set includes a base set of attributes and may include additional one or more attributes that are unique to a corresponding representation).

The AI model is configured to identify the plurality of attributes and their variations based on the plurality of images of the target object that is generated. That is, the AI model is configured to classify one or more attributes of the representations of the target object, wherein one attribute may include multiple variations based on the different representations. For example, the AI model may classify a tail as an attribute of the target object, with one or more variations of the tail. In particular, relevant features useful in classifying attributes of the target object are extracted from the images. Further, based on the extracted features, the AI model applies machine and/or deep learning to classify the attributes of the various representations of the target object, wherein machine learning is a sub-class of artificial intelligence, and deep learning is a sub-class of machine learning. As previously described, the attributes and their variations may be arranged within an array of attributes (e.g., array 400N of FIG. 4A).

Purely for illustration, the AI model 126 implementing deep/machine learning may be configured as a neural network. Generally, the neural network represents a network of interconnected nodes responding to input (e.g., extracted features) and generating an output (e.g., classify or identify or predict the intent of the performed gesture). In one implementation, the AI neural network includes a hierarchy of nodes. For example, there may be an input layer of nodes, an output layer of nodes, and intermediate or hidden layers of nodes. Input nodes are interconnected to hidden nodes in the hidden layers, and hidden nodes are interconnected to output nodes. Interconnections between nodes may have numerical weights that may be used link multiple nodes together between an input and output, such as when defining rules of the AI model. More particularly, the AI model 126 of FIG. 1B is configured to apply rules defining relationships between features and outputs (e.g., length corresponding to a particular tail attribute, etc.), wherein features may be defined within one or more nodes that are located at one or more hierarchical levels of the AI model 126. The rules link features (as defined by the nodes) between the layers of the hierarchy, such that a given input set of data leads to a particular output (e.g., attribute classification) of the AI model. For example, a rule may link (e.g., using relationship parameters including weights) one or more features or nodes throughout the AI model (e.g., in the hierarchical levels) between an input and an output, such that one or more features make a rule that is learned through training of the AI model. That is, each feature may be linked with one or more features at other layers, wherein one or more relationship parameters (e.g., weights) define interconnections between features at other layers of the AI model. As such, each rule or set of rules corresponds to a classified output. In that manner, the resulting output according to the rules of the AI model 126 may classify and/or label and/or identify and/or predict an attribute of the target object.

At 340, the method includes receiving selection of one or more of a plurality of variations of the plurality of attributes. In that manner, the user is able to select, edit and/or tune each of the one or more variations of each of the attributes previously generated. As previously described, selection of an attribute and/or a variation of the attribute enables the user to further modify and/or indicate a preference for that component. For example, a particular variation of a corresponding attribute may be selected (e.g., via an interface) by the user. The user may indicate a preference for that variation of the attribute, such as by favorably selecting the variation (e.g., indicating a "like" preference), or unfavorably selecting the variation (e.g., indicating a "dislike" preference). Also, the user may indicate a favorable preference by locking the variation of the attribute. Further, the user may indicate an unfavorable preference by completely deleting the variation. When tuning, the variation of the corresponding attribute may be further modified through user interaction. For illustration, the user may provide an editing input (e.g., text instruction, moving a slider, etc.) that when operated on will tune the variation of the attribute for inclusion into the list of variations for that corresponding attribute.

In one embodiment, the attributes may be automatically filtered. For example, a variation of a corresponding attribute may be filtered based on at least one filtering parameter. The filtering parameter may be automatically generated, or set manually by a user. The filter may be automatically applied or directed by the user. As such, one or more variations of corresponding attributes may be filtered through modification and/or deletion. For example, an attribute and/or a variation of a corresponding attribute may be filtered (e.g., deleted) to avoid objectionable material from being used to create or to influence the creation of the target object.

In another example, a user may be prevented through filtering from modifying a proprietary character in an offensive manner (e.g., modifying the character to exhibit offensive tattoos). In one implementation, the filtering may be enabled by presenting to the user a reduced set of tools for modifying attributes and their variations, such as when modifying a character or NPC within a video game. The reduced set of tools may be less complex than the tools presented to developers. As such, the ability to generate and/or modify characters is moderated.

In still another implementation, a user that acts as a moderator controls the generation of a target object (e.g., a character for a video game). For example, a character may be created by one or more developers, wherein the moderator is able to enact filters that moderate the use of the AI tools used to generate and/or edit one or more attributes and their variations. These filters may be automatically implemented. In that manner, the moderator is able to guide the development of the target object, and for purposes of illustration only, possibly prevent development of a character for a video game that may be offensive or unwanted (e.g., improperly directed towards mature game context, racist characters, war criminals, etc.).

In one embodiment, the creation of a target object may be performed cooperatively by a group of developers. Each of the developers may act independently to generate different versions of the target object. When collaborating, the different versions may be displayed simultaneously in an interface, such as displaying the versions within one or more sandboxes. The sandboxes are displayed simultaneously and show side-by-side development of a target object by the various designers. In that manner, a feature in one design (e.g., in one sandbox) can be incorporated into another design (in another sandbox), similar to the mix and match feature, previously described. As such, an agreed upon version by the group of designers can be created with agreed upon attributes. The final version may include similar attributes corresponding with features that are found within each of the versions provided by each of the designers, and also unique attributes corresponding with unique features that may be found in a particular version of a corresponding designer. In one implementation, the sandboxes are implemented through the use of a shared spreadsheet. For example, the spreadsheet may include one or more attributes and their corresponding variations. In other implementations, a designer may attach labels to their version of the target object, wherein the labels may limit the amount of control other developers may have to edit a corresponding attribute and/or variations of the corresponding attribute. As such, the target object may be dynamically created in real-time using a multi-developer generation process.

In some implementations, prompts used by the designers may also be displayed. In that manner, other designers may provide comments that further refine one or more of the prompts to be used in another iteration of target object generation.

At 350, the method includes blending the one or more of the plurality of variations of the plurality of attributes that have been selected into one or more options of the target object. In particular, one or more iterations of the creation of the target object may be performed. For example, based on the user interactions (e.g., selections, editing, modification inputs, inputs, etc.) of the attributes and their variations, the IGAI system may be tasked to generate second plurality of attributes for the target object using the process previously described. For example, the IGAI system may generate one or more versions and/or representations of the target object based on the attributes and/or variations of corresponding attributes that have been selected and/or edited. These representations of the target object are used to generate the second plurality of attributes and their variations for the current iteration of the target object. This process may be continually repeated in successive iterations of developing the target object until a final iteration is performed that outputs a final version of the target object that includes one or more options of the final version.

When building the final version of the target object, the final iteration of user interactions (e.g., selections, editing, modification inputs, inputs, etc.) of the attributes and their variations are considered. In particular, one or more options of the final version is generated based on the attributes and their variations. That is, each option includes most if not all of the attributes, with each option including a unique set of variations for those attributes. For example, a first option may include variation one of attribute one, but a second options may include variation two of attribute one, and so on for each attribute. For each of the different options, the unique set of variations of corresponding attributes are blended together. That is, generative AI is not used for blending to generate the corresponding option of the final version of the target object.

In one embodiment, it is determined that no variation of an attribute has been preferentially selected. In that case, a variation for that attribute is automatically selected for use when performing the blending of the selected variations of corresponding attributes used to generate the corresponding option of the final version of the target object. Selection of the variation may be performed randomly, or in some predefined order.

In one embodiment, the arrays including variations of corresponding attributes are saved. In that manner, the final version and their options may be saved, and exported for use in other services or applications. In addition, attributes and corresponding variations may be saved and exported for use in other services or applications. This may reduce development time for other target objects, such as other characters in the same video game or other video games.

Figure 5:
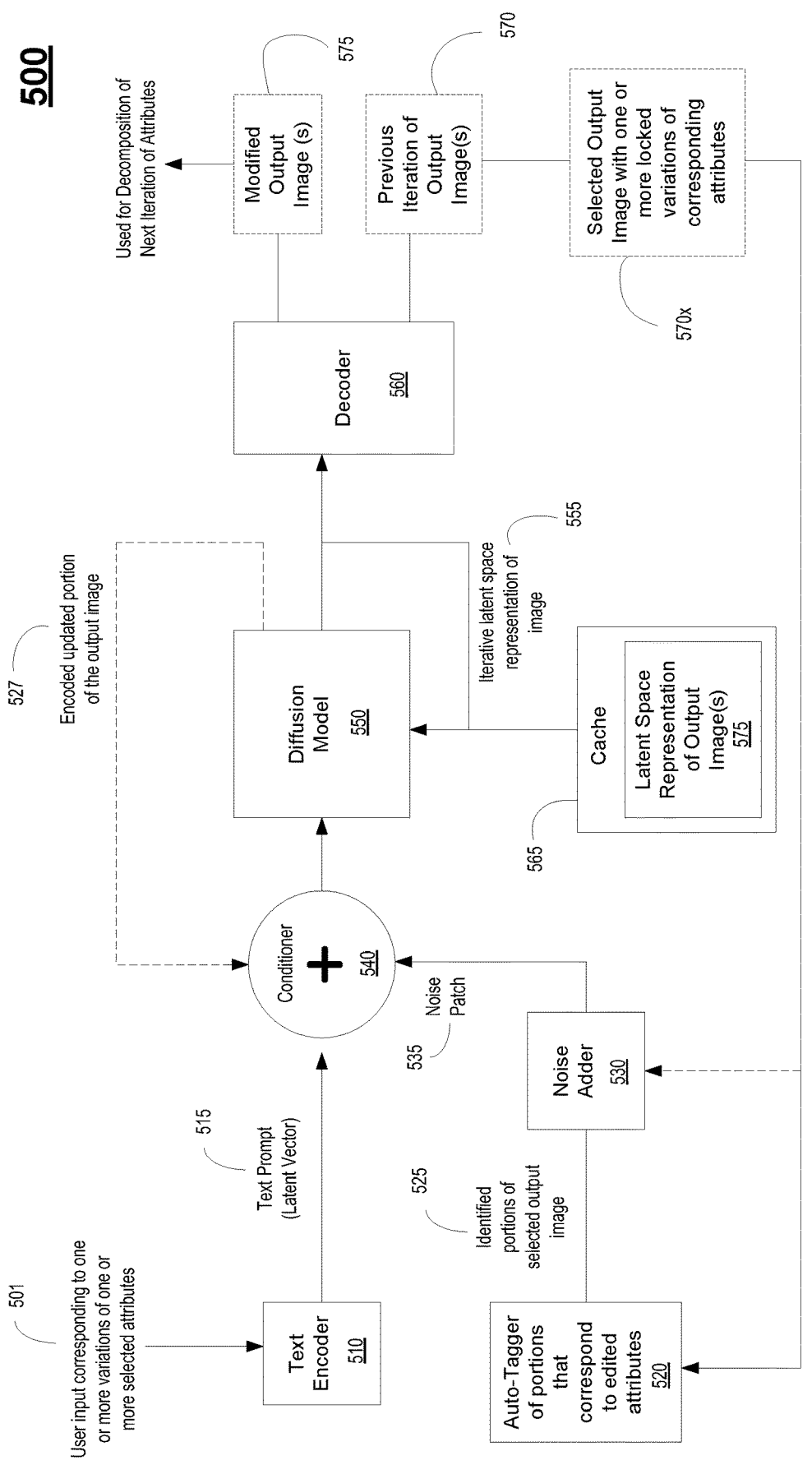
FIG. 5 is a diagram illustrating the flow of data for the generation of one or more versions of a target object over one or more iterations, in accordance with one embodiment of the present disclosure.

FIG. 5 is a flow diagram 500 illustrating the flow of data for the generation of one or more options of a final version of a target object over one or more process iterations, in accordance with one embodiment of the present disclosure. The operations performed in the flow diagram may be implemented by one or more of the entities previously described components, and also system 100 described in FIGS. 1A-1B. The process shown in FIG. 5 is intended to illustrate one method for performing the next iteration of generating a target object, but is not intended to be limiting.

In particular, latent diffusion techniques are used to generate one or more representations 570 of the target object for an iteration (e.g., previous iteration) of the overall process used to create a target object. For example, the one or more representations 570 of the target object may be provided as output (e.g., output images) by an IGAI processing model implementing generative AI, such as during the previous iteration of the overall process. During a next iteration of the overall process, a new iteration of one of the representations 570 (e.g., a selected output image 570x) of the target object is generated that takes into consideration user preferences, such as locked attributes or locked variations of corresponding attributes that the user definitely wants to keep in the final version of the target object that is created. During the next iteration, latent diffusion may be performed on one or more of the representations 570 of the target object generated during the previous iteration of the overall process to generate a new set of representations of the target object, wherein the new set may include the equal numbers, less numbers, or more numbers of representations than that provided by representations 570 in the previous iteration.

As previously described, latent diffusion is the process of adding and removing noise to generate an image (e.g., an output image of the target object for a corresponding iteration of the process used for creating the target object). For example, a desired image (e.g., target object including one or more options of a final version of the target object) can be generated from a noise patch concatenated with a vector (e.g., text encoded into a latent vector) for conditioning, wherein the vector defines the parameters by which the image is constructed using latent diffusion. Multiple steps of noising and denoising may be performed sub-iteratively by the diffusion model when generating one of the representations 570 of the target object (e.g., at each iteration of the process of creating the target object). In particular, at each sub-iterative step during one iteration of the overall process, the diffusion model 550 outputs a sub-iterative latent space representation 555 of the previously generated output image 570x, that may be selected automatically for the next iteration of the overall process for creating a final version of the target object and its options. Throughout the implementation of latent diffusion by a diffusion model 550, one or more latent space representations 555 of the selected output image 570x may be generated (e.g., at each sub-iterative step) during a current iteration of the overall process, such as those generated when denoising the noise patch based on the vector, which may be stored in cache 565. The last sub-iteration performed by the diffusion model generates the last latent space representation, which is then decoded by decoder 560 to generate one of the representations (e.g., output images) of the target object, provided as output in the next iteration of the overall process. This process may be performed to generate each of the representations of the target object in the next iteration of the overall process.

As previously described, a user may provide user input 501 directed to the attributes and/or variations of corresponding attributes that are found in the representations 570 of the target object generated during the previous iteration of the overall process. In particular, the user input directed to one or more variations of corresponding one or more attributes includes, in part, the following: selecting to indicate user preferences (e.g., like and/or dislike, etc.); and/or editing (e.g., modification, deletion, etc.), and/or tuning to modify a selected variation of a corresponding attribute. The user input 501 may not apply to locked attributes and/or locked variations of corresponding attributes, such that portions of an image corresponding to the locked features are retained when performing the next iteration. For purposes of illustration only, the user input 501 may be visualized within an array, such as array 400N of FIG. 4A.

As such, at least some of user input may be directed to identified portions of the selected output image 570x corresponding to user input. For example, a tagger 520 may be implemented to automatically identify a portion 525 of the selected output image 570x that corresponds to one or more variations of corresponding attributes that have been selected, and/or edited, and/or tuned, etc.

As shown, the user input 501 (e.g., array 400N) is encoded by an encoder 510 into a text prompt 515 that is suitable for use by an IGAI system. In addition, the encoder 510 may convert the text prompt into a latent vector for purposes of performing latent diffusion. In one implementation, a noise adder 530 is configured to process the identified portion 525 of the selected output image 570x and generate a noise patch 535, and/or a noisy version of the identified portion 525. In another implementation, the noise patch is randomly generated. In another implementation, a portion of the last latent space representation of the selected output image 570x is identified as corresponding to the identified portion 525, and is used when performing latent diffusion. For example, the noise adder 530 may be configured to identify the corresponding portion of the last latent space representation of the selected output image 570x, or the diffusion model 550 may be configured to perform the identification. As such, the noise patch 535 may be generated, based on the identified portion 525 of the selected output image 570x (i.e., in image form), or be based on the last latent space representation (e.g., the corresponding portion of the last latent space representation of the identified output image 570x).

Further, the noise patch 535 that corresponds to the identified portion 525 of the selected output image 570x is concatenated with the text prompt 515 (i.e., latent vector) as a first set of conditioning factors by the conditioner 540, and are provided as input into the diffusion model 550. Latent diffusion is performed to process and/or generate (e.g., encode or denoise) a modified or updated portion 527 of the selected output image 570x based on the first set of conditioning factors. The modified or updated portion of the original image 575 is encoded, such as into a latent space representation. As such, the encoded, modified or updated portion 527 of the selected output image 570x reflects the feedback provided by the user in at least some of the user input 501 (e.g., that corresponds to one or more variations of corresponding attributes that have been selected, and/or edited, and/or tuned, etc.).

Rather than decoding the encoded, modified or updated portion 527 of the selected output image 570x, the encoded, modified or updated portion 527 is provided back to the conditioner 540 to generate a second set of conditioning factors. In particular, changes to be made using latent diffusion on remaining portions of the selected output image 570x (i.e., corresponding to locked attributes and/or locked variations of corresponding attributes) are conditioned upon or are based on the result of conditioning the identified portion 525 of the selected output image 570x (i.e., the encoded, modified or updated portion 527) using a concatenated prompt. For example, the encoded, modified or updated portion 527 is, in part, concatenated with the text prompt 515 (or latent vector) that caused the change or modification to the identified portion 525 of the selected output image 570x, to generate a second set of conditioning factors (e.g., a second latent vector).

In one implementation, this second set of conditioning factors is then provided to the diffusion model 550 to perform latent diffusion on the last latent space representation of the selected output image 570x (i.e., the version that is decoded to generate the selected output image 570x) in order to change and/or modify, in part, the other portions of the selected output image 570x (i.e., corresponding to locked attributes and/or locked variations of corresponding attributes) to be consistent with changes and/or modifications made to the identified portions 525 (i.e., corresponding to the encoded, updated portion 527). For example, the diffusion model 550 may add noise to the last latent space representation of the selected output image 570x (i.e., the version that is decoded to generate the selected output image 570x) in order to perform latent diffusion (i.e., denoising) based on the second set of conditioning factors.

In another implementation, the second set of conditioning factors includes a noisy version of the last latent space representation of the selected output image 570x (i.e., decoded to generate the selected output image 570x) that may be generated by the noise adder 530. As a technical summary, the text prompt 515 (i.e., latent vector), that caused the change or modification to the selected portion 525, is provided with an encoding of the updated object (e.g., the encoded, updated portion 527) for purposes of performing latent diffusion by the diffusion model 550 on at least the remaining portions of the selected output image 570x (i.e., corresponding to locked attributes and/or locked variations of corresponding attributes).

In some implementations, the diffusion model 550 performs latent diffusion on the entire selected output image 570x (i.e., that is encoded), but makes minimal or no changes to the already modified selected portion 525. In that manner, the remaining portions can be aligned with, or take into account, the changes and/or modifications that were made to the selected portion 525 of the selected output image 570x (i.e., corresponding to the encoded, updated portion 527). In other implementations, the diffusion model 550 performs latent diffusion on the entire selected output image 570x (i.e., that is encoded), but makes minimal or no changes to the remaining portions of the selected output image 570x (i.e., corresponding to locked attributes and/or locked variations of corresponding attributes). Thereafter, the remaining portions can be blended with the changes and/or modifications that were made to the selected portion 525 of the selected output image 570x (i.e., corresponding to the encoded, updated portion 527).

As such, the diffusion model 550 generates another latent space representation of the image, now modified, and after decoding, the decoder 560 outputs a modified image of the selected output image 570x, wherein the modified image is one representation of the target object that is generated in the next iteration of the overall process. For example, one or more modified output images 575 are generated in the current iteration, and are the representations of the target object for that iteration. This process may be performed on some or all of the representations 570 generated in the previous iteration (i.e., to build the modified output images 575 that are newly generated representations of the target object), or at least those representations that include all of the user input corresponding to one or more variations of corresponding attributes that have been selected, and/or edited, and/or tuned, etc. This process may be performed iteratively for one or more iterative cycles in the overall process to achieve a desired, and/or final version of the target object, wherein the final version may include one or more options.

Figure 6:
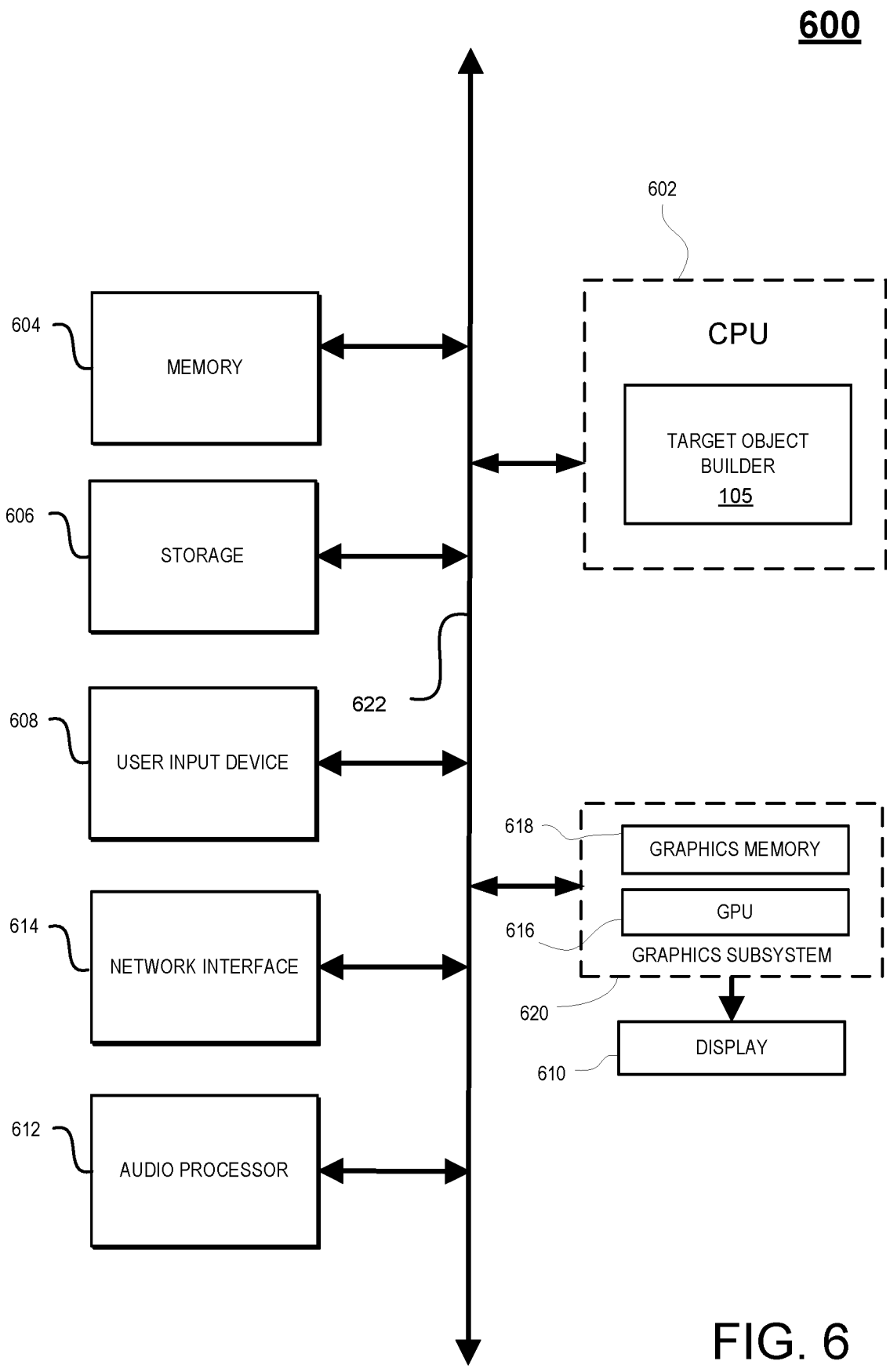
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, and includes a central processing unit (CPU) 602 for running software applications and optionally an operating system. CPU 602 may be comprised of one or more homogeneous or heterogeneous processing cores. Further embodiments can be implemented using one or more CPUs with microprocessor architectures specifically adapted for highly parallel and computationally intensive applications.

In particular, CPU 602 may be configured to implement a target object builder 105 that is configured to implement generative AI to build a target object through an iterative process including user input provided as feedback for the next iteration. For example, the target object builder 105 generates a plurality of attributes for the target object, wherein each of the attributes may include one or more variations. By combining different variations of corresponding attributes, one or more permutations of the target object may be generated by the target object builder 105.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs. In one embodiment, GPU 616 may be implemented within an AI engine (e.g., machine learning engine 190) to provide additional processing power, such as for the AI, machine learning functionality, or deep learning functionality, etc.

The graphics subsystem 620 periodically outputs pixel data for an image from graphics memory 618 to be displayed on display device 610. Display device 610 can be any device capable of displaying visual information in response to a signal from the device 600.

In other embodiments, the graphics subsystem 620 includes multiple GPU devices, which are combined to perform graphics processing for a single application that is executing on a CPU. For example, the multiple GPUs can perform alternate forms of frame rendering, including different GPUs rendering different frames and at different times, different GPUs performing different shader operations, having a master GPU perform main rendering and compositing of outputs from slave GPUs performing selected shader functions (e.g., smoke, river, etc.), different GPUs rendering different objects or parts of scene, etc. In the above embodiments and implementations, these operations could be performed in the same frame period (simultaneously in parallel), or in different frame periods (sequentially in parallel).

Accordingly, in various embodiments the present disclosure describes systems and methods configured for implementing generative AI to build a target object through an iterative process including user input provided as feedback for the next iteration.

It should be noted, that access services, such as providing access to games of the current embodiments, delivered over a wide geographical area often use cloud computing. Cloud computing is a style of computing in which dynamically scalable and often virtualized resources are provided as a service over the Internet. For example, cloud computing services often provide common applications (e.g., video games) online that are accessed from a web browser, while the software and data are stored on the servers in the cloud.

A game server may be used to perform operations for video game players playing video games over the internet, in some embodiments. In a multiplayer gaming session, a dedicated server application collects data from players and distributes it to other players. The video game may be executed by a distributed game engine including a plurality of processing entities (PEs) acting as nodes, such that each PE executes a functional segment of a given game engine that the video game runs on. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. The PEs may be virtualized by a hypervisor of a particular server, or the PEs may reside on different server units of a data center. Respective processing entities for performing the operations may be a server unit, a virtual machine, or a container, GPU, CPU, depending on the needs of each game engine segment. By distributing the game engine, the game engine is provided with elastic computing properties that are not bound by the capabilities of a physical server unit. Instead, the game engine, when needed, is provisioned with more or fewer compute nodes to meet the demands of the video game.

Users access the remote services with client devices (e.g., PC, mobile phone, etc.), which include at least a CPU, a display and I/O, and are capable of communicating with the game server. It should be appreciated that a given video game may be developed for a specific platform and an associated controller device. However, when such a game is made available via a game cloud system, the user may be accessing the video game with a different controller device, such as when a user accesses a game designed for a gaming console from a personal computer utilizing a keyboard and mouse. In such a scenario, an input parameter configuration defines a mapping from inputs which can be generated by the user's available controller device to inputs which are acceptable for the execution of the video game.

In another example, a user may access the cloud gaming system via a tablet computing device, a touchscreen smartphone, or other touchscreen driven device, where the client device and the controller device are integrated together, with inputs being provided by way of detected touchscreen inputs/gestures. For such a device, the input parameter configuration may define particular touchscreen inputs corresponding to game inputs for the video game (e.g., buttons, directional pad, gestures or swipes, touch motions, etc.).

In some embodiments, the client device serves as a connection point for a controller device. That is, the controller device communicates via a wireless or wired connection with the client device to transmit inputs from the controller device to the client device. The client device may in turn process these inputs and then transmit input data to the cloud game server via a network. For example, these inputs might include captured video or audio from the game environment that may be processed by the client device before sending to the cloud game server. Additionally, inputs from motion detection hardware of the controller might be processed by the client device in conjunction with captured video to detect the position and motion of the controller before sending to the cloud gaming server.

In other embodiments, the controller can itself be a networked device, with the ability to communicate inputs directly via the network to the cloud game server, without being required to communicate such inputs through the client device first, such that input latency can be reduced. For example, inputs whose detection does not depend on any additional hardware or processing apart from the controller itself can be sent directly from the controller to the cloud game server. Such inputs may include button inputs, joystick inputs, embedded motion detection inputs (e.g., accelerometer, magnetometer, gyroscope), etc.

Access to the cloud gaming network by the client device may be achieved through a network implementing one or more communication technologies. In some embodiments, the network may include 5th Generation (5G) wireless network technology including cellular networks serving small geographical cells. Analog signals representing sounds and images are digitized in the client device and transmitted as a stream of bits. 5G wireless devices in a cell communicate by radio waves with a local antenna array and low power automated transceiver. The local antennas are connected with a telephone network and the Internet by high bandwidth optical fiber or wireless backhaul connection. A mobile device crossing between cells is automatically transferred to the new cell. 5G networks are just one communication network, and embodiments of the disclosure may utilize earlier generation communication networks, as well as later generation wired or wireless technologies that come after 5G.

In one embodiment, the various technical examples can be implemented using a virtual environment via a head-mounted display (HMD), which may also be referred to as a virtual reality (VR) headset. As used herein, the term generally refers to user interaction with a virtual space/environment that involves viewing the virtual space through an HMD in a manner that is responsive in real-time to the movements of the HMD (as controlled by the user) to provide the sensation to the user of being in the virtual space or metaverse. An HMD can be worn in a manner similar to glasses, goggles, or a helmet, and is configured to display a video game or other metaverse content to the user. The HMD can provide a very immersive experience in a virtual environment with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures (e.g., commands, communications, pointing and walking toward a particular content item in the scene, etc.). In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network, such as internet, cellular, etc. In one embodiment, the cloud computing and gaming system maintains and executes the video game being played by the user. In some embodiments, the cloud computing and gaming system is configured to receive inputs from the HMD and/or interfacing objects over the network. The cloud computing and gaming system is configured to process the inputs to affect the game state of the executing video game. The output from the executing video game, such as video data, audio data, and haptic feedback data, is transmitted to the HMD and the interface objects.

Additionally, though implementations in the present disclosure may be described with reference to n HMD, it will be appreciated that in other implementations, non-HMDs may be substituted, such as, portable device screens (e.g., tablet, smartphone, laptop, etc.) or any other type of display that can be configured to render video and/or provide for display of an interactive scene or virtual environment. It should be understood that the various embodiments defined herein may be combined or assembled into specific implementations using the various features disclosed herein. Thus, the examples provided are just some possible examples, without limitation to the various implementations that are possible by combining the various elements to define many more implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein in embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server, or by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator that emulates a processing system.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:

collecting one or more inputs, each of which describes a target object;

generating a plurality of images of the target object using an image generation artificial intelligence (AI) system configured for implementing latent diffusion based on the one or more inputs;

decomposing the target object into a plurality of attributes based on the plurality of images of the target object, wherein each of the plurality of attributes includes one or more variations;

receiving selection of one or more of a plurality of variations of the plurality of attributes; and blending the one or more of the plurality of variations of the plurality of attributes that have been selected into one or more options of the target object.

2. The method of claim 1, further comprising:

providing a prompt to the image generation AI system to generate the plurality of images of the target object.

3. The method of claim 2, wherein the decomposing the target object includes:

providing the plurality of images of the target object to an AI model configured to extract the plurality of attributes from the plurality of images.

4. The method of claim 1, further comprising:

editing one or more of the plurality of variations of the plurality of attributes; and using the image generation AI system to generate a second plurality of attributes for the target object based on the one or more of the plurality of variations of the plurality of attributes that have been edited and the one or more inputs that have been collected.

5. The method of claim 4, wherein the editing of the one or more of the plurality of variations of the plurality of attributes includes:

receiving selection of a variation of an attribute;

receiving an editing input; and tuning the variation of the attribute based on the editing input for inclusion in the plurality of variations of the plurality of attributes.

6. The method of claim 4, wherein the editing of the one or more of the plurality of variations of the plurality of attributes includes:

filtering a variation of an attribute based on at least one filtering parameter.

7. The method of claim 4, wherein the editing of the one or more of the plurality of variations of the plurality of attributes includes:

receiving selection of a variation of an attribute;

receiving an editing input; and favorably or unfavorably selecting the variation of the attribute based on the editing input.

8. The method of claim 4, wherein the editing of the one or more of the plurality of variations of the plurality of attributes includes:

receiving selection of a variation of an attribute;

receiving an editing input; and locking the variation of the attribute based on the editing input.

9. The method of claim 1, determining that no variation of an attribute has been selected; and automatically selecting a variation of the attribute for performing the blending of the plurality of variations of the plurality of attributes that have been selected.

10. The method of claim 1, further comprising:

saving at least one of the plurality of variations of the plurality of attributes that has been selected for use in building a second target object.

11. A computer system comprising:

a processor;

memory coupled to the processor and having stored therein instructions that, if executed by the computer system, cause the computer system to execute a method, comprising:

collecting one or more inputs, each of which describes a target object;

generating a plurality of images of the target object using an image generation artificial intelligence (AI) system configured for implementing latent diffusion based on the one or more inputs;

decomposing the target object into a plurality of attributes based on the plurality of images of the target object, wherein each of the plurality of attributes includes one or more variations;

receiving selection of one or more of a plurality of variations of the plurality of attributes; and blending the one or more of the plurality of variations of the plurality of attributes that have been selected into one or more options of the target object.

12. The computer system of claim 11, the method further comprising:

editing one or more of the plurality of variations of the plurality of attributes; and using the image generation AI system to generate a second plurality of attributes for the target object based on the one or more of the plurality of variations of the plurality of attributes that have been edited and the one or more inputs that have been collected.

13. The computer system of claim 12, wherein in the method the editing of the one or more of the plurality of variations of the plurality of attributes includes:

receiving selection of a variation of an attribute;

receiving an editing input; and tuning the variation of the attribute based on the editing input for inclusion in the plurality of variations of the plurality of attributes.

14. The computer system of claim 12, wherein in the method the editing of the one or more of the plurality of variations of the plurality of attributes includes:

receiving selection of a variation of an attribute;

receiving an editing input; and favorably or unfavorably selecting the variation of the attribute based on the editing input.

15. The computer system of claim 12, wherein in the method the editing of the one or more of the plurality of variations of the plurality of attributes includes:

receiving selection of a variation of an attribute;

receiving an editing input; and locking the variation of the attribute based on the editing input.

16. A non-transitory computer-readable storage medium storing a computer program executable by a processor-based system, comprising:

program instructions for collecting one or more inputs, each of which describes a target object;

program instructions for generating a plurality of images of the target object using an image generation artificial intelligence (AI) system configured for implementing latent diffusion based on the one or more inputs;

program instructions for decomposing the target object into a plurality of attributes based on the plurality of images of the target object, wherein each of the plurality of attributes includes one or more variations;

program instructions for receiving selection of one or more of a plurality of variations of the plurality of attributes; and program instructions for blending the one or more of the plurality of variations of the plurality of attributes that have been selected into one or more options of the target object.

17. The non-transitory computer-readable storage medium of claim 16, further comprising:

program instructions for editing one or more of the plurality of variations of the plurality of attributes; and program instructions for using the image generation AI system to generate a second plurality of attributes for the target object based on the one or more of the plurality of variations of the plurality of attributes that have been edited and the one or more inputs that have been collected.

18. The non-transitory computer-readable storage medium of claim 17, wherein the editing of the one or more of the plurality of variations of the plurality of attributes includes:

program instructions for receiving selection of a variation of an attribute;

program instructions for receiving an editing input; and program instructions for tuning the variation of the attribute based on the editing input for inclusion in the plurality of variations of the plurality of attributes.

19. The non-transitory computer-readable storage medium of claim 17, wherein the editing of the one or more of the plurality of variations of the plurality of attributes includes:

program instructions for receiving selection of a variation of an attribute;

program instructions for receiving an editing input; and program instructions for favorably or unfavorably selecting the variation of the attribute based on the editing input.

20. The non-transitory computer-readable storage medium of claim 17, wherein the editing of the one or more of the plurality of variations of the plurality of attributes includes:

program instructions for receiving selection of a variation of an attribute;

program instructions for receiving an editing input; and program instructions for locking the variation of the attribute based on the editing input.

* * * * *